United States Patent
Woo et al.

(10) Patent No.: US 11,194,545 B2
(45) Date of Patent: Dec. 7, 2021

(54) ELECTRONIC DEVICE FOR PERFORMING OPERATION ACCORDING TO USER INPUT AFTER PARTIAL LANDING

(71) Applicant: Samsung Electronics Co., Ltd., Suwon-si (KR)

(72) Inventors: Kyoung Gu Woo, Seoul (KR); Ho Jun Jaygarl, Hwaseong-si (KR); Han Jun Ku, Suwon-si (KR); Kyung Tae Kim, Hwaseong-si (KR); Ga Jin Song, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 176 days.

(21) Appl. No.: 16/493,277

(22) PCT Filed: Mar. 8, 2018

(86) PCT No.: PCT/KR2018/002775
§ 371 (c)(1),
(2) Date: Sep. 11, 2019

(87) PCT Pub. No.: WO2018/174445
PCT Pub. Date: Sep. 27, 2018

(65) Prior Publication Data
US 2020/0034112 A1      Jan. 30, 2020

(30) Foreign Application Priority Data

Mar. 24, 2017 (KR) .......................... 10-2017-0037912

(51) Int. Cl.
*G06F 3/16* (2006.01)
*G06F 9/451* (2018.01)
*G06N 20/00* (2019.01)

(52) U.S. Cl.
CPC .............. *G06F 3/167* (2013.01); *G06F 9/451* (2018.02); *G06N 20/00* (2019.01)

(58) Field of Classification Search
CPC .......... G06N 20/00; G06N 7/005; G06N 5/02; G06N 5/00; G06N 5/003; G06F 9/451; G06F 3/167
See application file for complete search history.

(56) References Cited

U.S. PATENT DOCUMENTS 10,114,676 B2    10/2018  Bikkula et al.
2010/0185569 A1*  7/2010  Hu .......................... G06N 20/00
                                                                 706/12

(Continued)

FOREIGN PATENT DOCUMENTS

KR    10-2014-0001031 A    1/2014
KR    10-2014-0052323 A    5/2014

(Continued)

OTHER PUBLICATIONS

ISA/KR, "International Search Report and Written Opinion of the International Searching Authority," International Application No. PCT/KR2018/002775, dated Jun. 7, 2018, 11 pages.

*Primary Examiner* — Mahelet Shiberou

(57) ABSTRACT

The electronic device according to an embodiment may receive a first user input including a first request for performing a first task requiring one or more first parameters for execution, to transmit first data associated with the first user input through the communication circuit to a server including an intelligence system providing a sequence of action states for the electronic device performing at least one task using the at least one application program, to receive the first sequence of the action states for performing the first task, from the server through the communication circuit, to perform not all but part of the first sequence of the action states, based at least on the first user input, and to transmit second (Continued)

data associated with an action state of the electronic device caused from the performing of the part of the first sequence, to the server through the communication circuit.

16 Claims, 27 Drawing Sheets

(56) References Cited

U.S. PATENT DOCUMENTS

| | | | |
|---|---|---|---|
| 2011/0054900 A1* | 3/2011 | Phillips | G10L 15/30 704/235 |
| 2014/0082501 A1* | 3/2014 | Bae | G06F 3/167 715/728 |
| 2014/0123149 A1* | 5/2014 | Maple | G06F 9/44536 718/102 |
| 2014/0218372 A1* | 8/2014 | Missig | G06F 3/167 345/473 |
| 2014/0258857 A1* | 9/2014 | Dykstra-Erickson | G06F 3/0481 715/708 |
| 2016/0034253 A1* | 2/2016 | Bang | G06F 9/5055 715/728 |
| 2016/0328270 A1* | 11/2016 | Bikkula | G06F 3/038 |

FOREIGN PATENT DOCUMENTS

| | | |
|---|---|---|
| KR | 10-2015-0104930 A | 9/2015 |
| KR | 10-1579292 B1 | 12/2015 |

\* cited by examiner

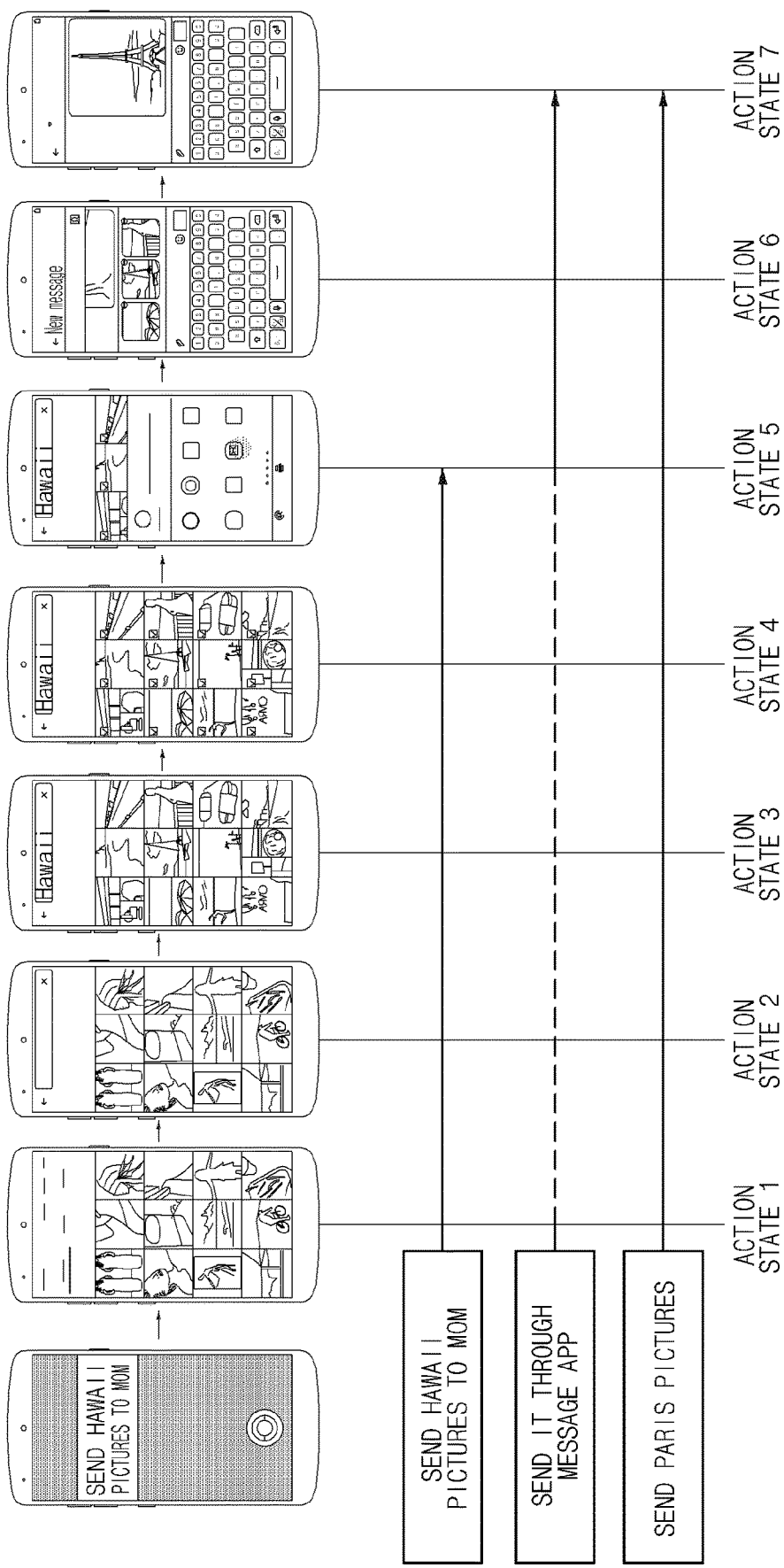

ELECTRONIC DEVICE FOR PERFORMING OPERATION ACCORDING TO USER INPUT AFTER PARTIAL LANDING

CROSS-REFERENCE TO RELATED APPLICATIONS

This application is a 371 National Stage of International Application No. PCT/KR2018/002775, filed Mar. 8, 2018, which claims priority to Korean Patent Application No. 10-2017-0037912, filed Mar. 24, 2017, the disclosures of which are herein incorporated by reference in their entirety.

BACKGROUND

1. Field

The disclosure relates to a technology for performing an action according to a user input after partial landing.

2. Description of Related Art

An artificial intelligence system refers to a system, which learns and judges by itself and improves a recognition rate as it is used, as a computer system which implements human-level intelligence.

An artificial intelligence technology may include a machine learning (deep learning) technique using an algorithm that classifies or learns the characteristics of pieces of input data by itself, and element technologies that emulate the functions of a human brain, for example, recognition, determination, and the like, by using a machine learning algorithm.

For example, the element technologies may include at least one of a language understanding technology that recognizes a language/character of a human, a visual understanding technology that recognizes objects like human vision, an inference or prediction technique that determines information to logically infer and predict the determined information, a knowledge expression technology that processes human experience information as knowledge data, and an operation control technology that controls autonomous driving of the vehicle and the motion of the robot.

In addition to a conventional input scheme using a keyboard or a mouse, the latest electronic devices have supported various input schemes such as a voice input and the like. For example, the electronic device such as a smartphone or a tablet PC may recognize the voice of a user input in a state where a speech recognition service is executed and may execute an action corresponding to a voice input or may provide the result found depending on the voice input.

Nowadays, the speech recognition service is being developed based on a technology processing a natural language. The technology processing the natural language refers to a technology that grasps the intent of the user utterance and provides the user with the result suitable for the intent.

SUMMARY

Because the conventional speech recognition service displays only the result according to a user's input when recognizing and processing the user's voice, the conventional speech recognition service may process only the user's voice, such as executing the program, and a user input to request the execution of a plurality of applications may not be processed.

When a user's voice input does not include all the information necessary to perform an action, the conventional speech recognition service may not perform a task until obtaining all the information.

Various embodiments of the disclosure may perform an action capable of being performed based on the received user input when a user input in which some information necessary to perform a task is missing is received.

Various embodiments of the disclosure are provide a method of effectively performing an action according to a user input by receiving an additional user input and not repeating the already performed action based on the previous user input and the additional user input.

An electronic device according to an embodiment disclosed in the disclosure may include housing, a display exposed through a part of the housing, a microphone, a speaker, a communication circuit, a processor electrically connected to the display, the microphone, the speaker, and the communication circuit, and a memory electrically connected to the processor. The memory may be configured to store at least one application program. Instructions stored by the memory may, when executed, cause the processor to receive a first user input including a first request for performing a first task requiring one or more first parameters for execution, to transmit first data associated with the first user input through the communication circuit to a server including an intelligence system providing a sequence of action states for the electronic device performing at least one task using the at least one application program, to receive the first sequence of the action states for performing the first task, from the server through the communication circuit, to perform not all but part of the first sequence of the action states, based at least on the first user input, and to transmit second data associated with an action state of the electronic device caused from the performing of the part of the first sequence, to the server through the communication circuit. The first user input may not include all of the one or more first parameters.

An electronic device according to an embodiment disclosed in the disclosure may include housing, a display exposed through a part of the housing, a microphone, a speaker, a communication circuit, a processor electrically connected to the display, the microphone, the speaker, and the communication circuit, and a memory electrically connected to the processor. The memory may be configured to store at least one application program. Instructions stored by the memory may, when executed, cause the processor to receive a first user input including a first request for performing a first task requiring one or more first parameters for execution, to transmit first data associated with the first user utterance through the communication circuit to a server including an intelligence system including a sequence of a plurality of action states for the electronic device performing at least one task using the at least one application program, to receive the first sequence of the plurality of action states for performing the first task, from the server through the communication circuit, to perform not all but part of the first sequence of the action states, based at least on the first sequence of the plurality of action states, to receive a second user input including the missing first parameters, through the microphone or a user interface on the display; and to perform the remaining parts of the first sequence of the action states, based on at least part of the first sequence of the action states corresponding to the received second user input, in the first sequence of the plurality of action states. The first user input may not include all of the one or more first parameters.

According to an embodiment disclosed in the disclosure, a computer-readable recording medium may store instructions, when executed by a processor of an electronic device, causing the electronic device to perform receiving a first user input including a first request for performing a first task requiring one or more first parameters for execution, transmitting first data associated with the first user input through the communication circuit to a server including an intelligence system including a sequence of action states for the electronic device performing at least one task using the at least one application program, receiving the first sequence of the action states for performing the first task, from the server through the communication circuit, performing not all but part of the first sequence of the action states, based at least on the first user input, and transmitting second data associated with an action state of the electronic device caused from the performing of the part of the first sequence, to the server through the communication circuit. The first user input may not include all of the one or more first parameters.

According to various embodiments of the disclosure, an action may be stepwise performed using only the received user input even through a user input does not include necessary information, and an additional input may be received from a user to perform the remaining actions, thereby providing an effective service so as to be matched to the intent of a user.

According to various embodiments of the disclosure, it is possible to provide a service capable of effectively performing an action by not repeating the already performed action when the remaining actions are performed.

Besides, a variety of effects directly or indirectly understood through the disclosure may be provided.

BRIEF DESCRIPTION OF THE DRAWINGS

FIGS. 16B and 16C are views illustrating the case where a user terminal receives a second user utterance to perform a second task after performing a first task, according to an embodiment of the disclosure.

DETAILED DESCRIPTION

Hereinafter, various embodiments of the disclosure may be described to be associated with accompanying drawings. Accordingly, those of ordinary skill in the art will recognize that modification, equivalent, and/or alternative on the various embodiments described herein can be variously made without departing from the scope and spirit of the disclosure.

1. Integrated Intelligence System

Before describing an embodiment of the disclosure, an integrated intelligence system to which an embodiment of the disclosure is applied will be described.

Figure 1:
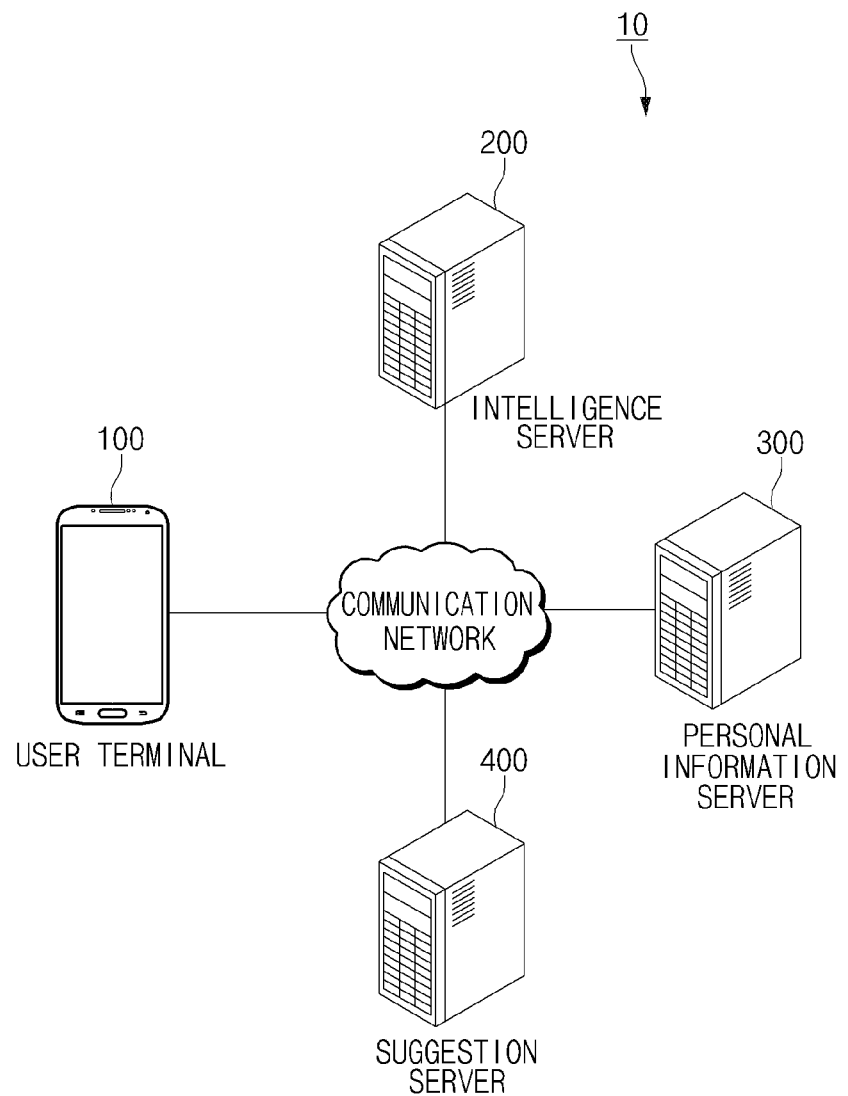
FIG. 1 is a view illustrating an integrated intelligence system, according to various embodiments of the disclosure.

FIG. 1 is a view illustrating an integrated intelligence system, according to various embodiments of the disclosure.

Referring to FIG. 1, an integrated intelligence system 10 may include a user terminal 100, an intelligence server 200, a personal information server 300, or a suggestion server 400.

The user terminal 100 may provide a service necessary for a user through an app (or an application program) (e.g., an alarm app, a message app, a picture (gallery) app, or the like) stored in the user terminal 100. For example, the user terminal 100 may execute and operate other app through an intelligence app (or a speech recognition app) stored in the user terminal 100. A user input for launching and operating the other app through the intelligence app of the user terminal 100 may be received. For example, the user input may be received through a physical button, a touch pad, a voice input, a remote input, or the like. According to an embodiment, various types of terminal devices (or an electronic device), which are connectable with Internet, such as a mobile phone, a smartphone, personal digital assistant (PDA), a notebook computer, and the like may correspond to the user terminal 100.

According to an embodiment, the user terminal 100 may receive user utterance as a user input. The user terminal 100 may receive the user utterance and may generate an instruction for operating an app based on the user utterance. As such, the user terminal 100 may operate the app by using the instruction.

The intelligence server 200 may receive a voice input of a user from the user terminal 100 over a communication network and may change the voice input to text data. In another embodiment, the intelligence server 200 may generate (or select) a path rule based on the text data. The path rule may include information about an action (or an operation) for performing the function of an app or information about a parameter necessary to perform the action. In addition, the path rule may include the order of the action of the app. The user terminal 100 may receive the path rule, may select an app depending on the path rule, and may execute an action included in the path rule in the selected app.

For example, the user terminal 100 may execute the action and may display a screen corresponding to a state of the user terminal 100, which executes the action, in a display. For another example, the user terminal 100 may execute the action and may not display the result obtained by executing the action in the display. For example, the user terminal 100 may execute a plurality of actions and may display only the result of a part of the plurality of actions in the display. For example, the user terminal 100 may display only the result, which is obtained by executing the last action, in the display. For another example, the user terminal 100 may receive the user input to display the result obtained by executing the action in the display.

The personal information server 300 may include a database in which user information is stored. For example, the personal information server 300 may receive the user information (e.g., context information, information about execution of an app, or the like) from the user terminal 100 and may store the user information in the database. The intelligence server 200 may be used to receive the user information from the personal information server 300 over the communication network and to generate a path rule associated with the user input. According to an embodiment, the user terminal 100 may receive the user information from the personal information server 300 over the communication network, and may use the user information as information for managing the database.

The suggestion server 400 may include a database storing information about a function in a terminal, introduction of an application, or a function to be provided. For example, the suggestion server 400 may include a database associated with a function that a user utilizes by receiving the user information of the user terminal 100 from the personal information server 300. The user terminal 100 may receive information about the function to be provided from the suggestion server 400 over the communication network and may provide the information to the user.

Figure 2:
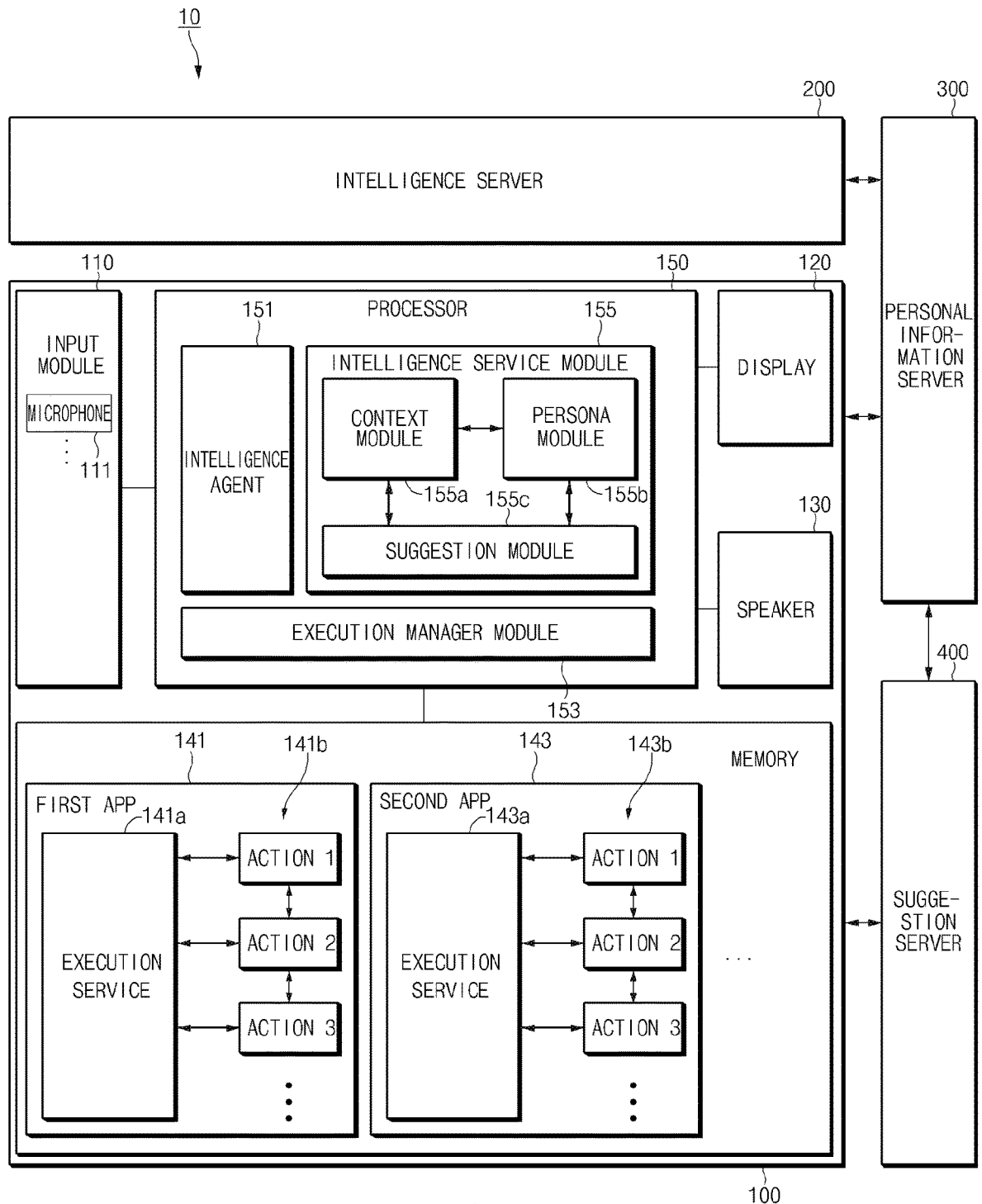
FIG. 2 is a block diagram illustrating a user terminal of an integrated intelligence system, according to an embodiment of the disclosure.

FIG. 2 is a block diagram illustrating a user terminal of an integrated intelligence system, according to an embodiment of the disclosure.

Referring to FIG. 2, the user terminal 100 may include an input module 110, a display 120, a speaker 130, a memory 140, or a processor 150. The user terminal 100 may further include housing, and elements of the user terminal 100 may be seated in the housing or may be positioned on the housing.

According to an embodiment, the input module 110 may receive a user input from a user. For example, the input module 110 may receive the user input from the connected external device (e.g., a keyboard or a headset). For another example, the input module 110 may include a touch screen (e.g., a touch screen display) coupled to the display 120. For another example, the input module 110 may include a hardware key (or a physical key) placed in the user terminal 100 (or the housing of the user terminal 100).

According to an embodiment, the input module 110 may include a microphone (e.g., a microphone 111 of FIG. 3) that is capable of receiving user utterance as a voice signal. For example, the input module 110 may include a speech input system and may receive the utterance of the user as a voice signal through the speech input system.

According to an embodiment, the display 120 may display an image, a video, and/or an execution screen of an application. For example, the display 120 may display a graphic user interface (GUI) of an app.

According to an embodiment, the speaker 130 may output the voice signal. For example, the speaker 130 may output the voice signal generated in the user terminal 100 to the outside.

According to an embodiment, the memory 140 may store a plurality of apps 141 and 143. The plurality of apps 141 and 143 stored in the memory 140 may be selected, launched, and executed depending on the user input.

According to an embodiment, the memory 140 may include a database capable of storing information necessary to recognize the user input. For example, the memory 140 may include a log database capable of storing log information. For another example, the memory 140 may include a persona database capable of storing user information.

According to an embodiment, the memory 140 may store the plurality of apps 141 and 143, and the plurality of apps 141 and 143 may be loaded to operate. For example, the plurality of apps 141 and 143 stored in the memory 140 may be loaded by an execution manager module 153 of the processor 150 to operate. The plurality of apps 141 and 143 may include execution services 141a and 143a performing a function or a plurality of actions (or unit actions) 141b and 143b. The execution services 141a and 143a may be generated by the execution manager module 153 of the processor 150 and then may execute the plurality of actions 141b and 143b.

According to an embodiment, when the actions 141b and 143b of the apps 141 and 143 are executed, an execution state screen according to the execution of the actions 141b and 143b may be displayed in the display 120. For example, the execution state screen may be a screen in a state where the actions 141b and 143b are completed. For another example, the execution state screen may be a screen in a state where the execution of the actions 141b and 143b is in partial landing (e.g., when a parameter necessary for the actions 141b and 143b are not input).

According to an embodiment, the execution services 141a and 143a may execute the actions 141b and 143b depending on a path rule. For example, the execution services 141a and 143a may be activated by the execution manager module 153, may receive an execution request from the execution manager module 153 depending on the path rule, and may execute the actions 141b and 143b of the apps 141 and 143 depending on the execution request. When the execution of the actions 141b and 143b is completed, the execution services 141a and 143a may transmit completion information to the execution manager module 153.

According to an embodiment, when the plurality of the actions 141b and 143b are respectively executed in the apps 141 and 143, the plurality of the actions 141b and 143b may be sequentially executed. When the execution of one action (action 1) is completed, the execution services 141a and 143a may open the next action (action 2) and may transmit completion information to the execution manager module 153. Here, it is understood that opening an arbitrary action is to change a state of the arbitrary action to an executable state or to prepare the execution of the arbitrary action. In other words, when the arbitrary action is not opened, the corresponding action may be not executed. When the completion information is received, the execution manager module 153 may transmit an execution request for the next actions 141b and 143b to an execution service (e.g., action 2). According to an embodiment, when the plurality of apps 141 and 143 are executed, the plurality of apps 141 and 143 may be sequentially executed. For example, when receiving the completion information after the execution of the last action of the first app 141 is executed, the execution manager module 153 may transmit the execution request of the first action of the second app 143 to the execution service 143a.

According to an embodiment, when the plurality of the actions 141b and 143b are executed in the apps 141 and 143, a result screen according to the execution of each of the executed plurality of the actions 141b and 143b may be displayed in the display 120. According to an embodiment, only a part of a plurality of result screens according to the executed plurality of the actions 141b and 143b may be displayed in the display 120.

According to an embodiment, the memory 140 may store an intelligence app (e.g., a speech recognition app) operating in conjunction with an intelligence agent 151. The app operating in conjunction with the intelligence agent 151 may receive and process the utterance of the user as a voice signal. According to an embodiment, the app operating in conjunction with the intelligence agent 151 may be operated by a specific input (e.g., an input through a hardware key, an input through a touch screen, or a specific voice input) input through the input module 110.

According to an embodiment, the processor 150 may control overall actions of the user terminal 100. For example, the processor 150 may control the input module 110 to receive the user input. The processor 150 may control the display 120 to display an image. The processor 150 may control the speaker 130 to output the voice signal. The processor 150 may control the memory 140 to read or store necessary information.

According to an embodiment, the processor 150 may include the intelligence agent 151, the execution manager module 153, or an intelligence service module 155. In an embodiment, the processor 150 may drive the intelligence agent 151, the execution manager module 153, or the intelligence service module 155 by executing instructions stored in the memory 140. Modules described in various embodiments of the disclosure may be implemented by hardware or by software. In various embodiments of the disclosure, it is understood that the action executed by the intelligence agent 151, the execution manager module 153, or the intelligence service module 155 is an action executed by the processor 150.

According to an embodiment, the intelligence agent 151 may generate an instruction for operating an app based on the voice signal received as the user input. According to an embodiment, the execution manager module 153 may receive the generated instruction from the intelligence agent 151, and may select, launch, and operate the apps 141 and 143 stored in the memory 140. According to an embodiment, the intelligence service module 155 may manage information of the user and may use the information of the user to process the user input.

The intelligence agent 151 may transmit and process the user input received through the input module 110 to the intelligence server 200.

According to an embodiment, before transmitting the user input to the intelligence server 200, the intelligence agent 151 may pre-process the user input. According to an embodiment, to pre-process the user input, the intelligence agent 151 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input to search for a part in which the user voice is present. The AGC module may adjust the volume of the user input so as to be suitable to recognize and process the user input. According to an embodiment, the intelligence agent 151 may include all the pre-processing elements for performance. However, in another embodiment, the intelligence agent 151 may include a part of the pre-processing elements to operate at low power.

According to an embodiment, the intelligence agent 151 may include a wake up recognition module recognizing a call of a user. The wake up recognition module may recognize a wake up instruction of the user through the speech recognition module. In the case where the wake up recognition module receives the wake up instruction, the wake up recognition module may activate the intelligence agent 151 to receive the user input. According to an embodiment, the wake up recognition module of the intelligence agent 151 may be implemented with a low-power processor (e.g., a processor included in an audio codec). According to an embodiment, the intelligence agent 151 may be activated depending on the user input entered through a hardware key. In the case where the intelligence agent 151 is activated, an intelligence app (e.g., a speech recognition app) operating in conjunction with the intelligence agent 151 may be executed.

According to an embodiment, the intelligence agent 151 may include a speech recognition module for performing the user input. The speech recognition module may recognize the user input for executing an action in an app. For example, the speech recognition module may recognize a limited user (voice) input (e.g., utterance such as "click" for executing a capturing action when a camera app is being executed) for executing an action such as the wake up instruction in the apps 141 and 143. For example, the speech recognition module for recognizing a user input while assisting the intelligence server 200 may recognize and rapidly process a user instruction capable of being processed in the user terminal 100. According to an embodiment, the speech recognition module for executing the user input of the intelligence agent 151 may be implemented in an app processor.

According to an embodiment, the speech recognition module (including the speech recognition module of a wake up module) of the intelligence agent 151 may recognize the user input by using an algorithm for recognizing a voice. For example, the algorithm for recognizing the voice may be at least one of a hidden Markov model (HMM) algorithm, an artificial neural network (ANN) algorithm, or a dynamic time warping (DTW) algorithm.

According to an embodiment, the intelligence agent 151 may change the voice input of the user to text data. According to an embodiment, the intelligence agent 151 may transmit the voice of the user to the intelligence server 200 to receive the changed text data. As such, the intelligence agent 151 may display the text data in the display 120.

According to an embodiment, the intelligence agent 151 may receive a path rule from the intelligence server 200. According to an embodiment, the intelligence agent 151 may transmit the path rule to the execution manager module 153.

According to an embodiment, the intelligence agent 151 may transmit the execution result log according to the path rule received from the intelligence server 200 to the intelligence service module 155, and the transmitted execution result log may be accumulated and managed in preference information of the user of a persona module 155*b*.

According to an embodiment, the execution manager module 153 may receive the path rule from the intelligence agent 151 to execute the apps 141 and 143 and may allow the apps 141 and 143 to execute the actions 141*b* and 143*b* included in the path rule. For example, the execution manager module 153 may transmit instruction information for executing the actions 141*b* and 143*b* to the apps 141 and 143 and may receive completion information of the actions 141*b* and 143*b* from the apps 141 and 143.

According to an embodiment, the execution manager module 153 may transmit or receive the instruction information for executing the actions 141*b* and 143*b* of the apps 141 and 143 between the intelligence agent 151 and the apps 141 and 143. The execution manager module 153 may bind the apps 141 and 143 to be executed depending on the path rule and may transmit the instruction information of the actions 141*b* and 143*b* included in the path rule to the apps 141 and 143. For example, the execution manager module 153 may sequentially transmit the actions 141*b* and 143*b* included in the path rule to the apps 141 and 143 and may sequentially execute the actions 141*b* and 143*b* of the apps 141 and 143 depending on the path rule.

According to an embodiment, the execution manager module 153 may manage execution states of the actions 141*b* and 143*b* of the apps 141 and 143. For example, the execution manager module 153 may receive information about the execution states of the actions 141*b* and 143*b* from the apps 141 and 143. For example, when the execution states of the actions 141*b* and 143*b* are in partial landing (e.g., when a parameter necessary for the actions 141*b* and 143*b* are not input), the execution manager module 153 may transmit information about the partial landing to the intelligence agent 151. The intelligence agent 151 may make a request for an input of necessary information (e.g., parameter information) to the user by using the received information. For another example, when the execution state of the actions 141*b* and 143*b* are in an operating state, the utterance may be received from the user, and the execution manager module 153 may transmit information about the apps 141 and 143 being executed and the execution states of the apps 141 and 143 to the intelligence agent 151. The intelligence agent 151 may receive parameter information of the utterance of the user through the intelligence server 200 and may transmit the received parameter information to the execution manager module 153. The execution manager module 153 may change a parameter of each of the actions 141*b* and 143*b* to a new parameter by using the received parameter information.

According to an embodiment, the execution manager module 153 may transmit the parameter information included in the path rule to the apps 141 and 143. When the plurality of apps 141 and 143 are sequentially executed depending on the path rule, the execution manager module 153 may transmit the parameter information included in the path rule from one app to another app.

According to an embodiment, the execution manager module 153 may receive a plurality of path rules. The execution manager module 153 may select a plurality of path rules based on the utterance of the user. For example, when the user utterance specifies the app 141 executing a part of the action 141*b* but does not specify the app 143 executing any other action 143*b*, the execution manager module 153 may receive a plurality of different path rules in which the same app 141 (e.g., an gallery app) executing the part of the action 141*b* is executed and in which different apps 143 (e.g., a message app or a Telegram app) executing the other action 143*b*. For example, the execution manager module 153 may execute the same actions 141*b* and 143*b* (e.g., the same successive actions 141*b* and 143*b*) of the plurality of path rules. In the case where the execution manager module 153 executes the same action, the execution manager module 153 may display a state screen for selecting the different apps 141 and 143 included in the plurality of path rules in the display 120.

According to an embodiment, the intelligence service module 155 may include a context module 155*a*, the persona module 155*b*, or a suggestion module 155*c*.

The context module 155*a* may collect current states of the apps 141 and 143 from the apps 141 and 143. For example, the context module 155*a* may receive context information indicating the current states of the apps 141 and 143 to collect the current states of the apps 141 and 143.

The persona module 155*b* may manage personal information of the user utilizing the user terminal 100. For example, the persona module 155*b* may collect the usage information and the execution result of the user terminal 100 to manage personal information of the user.

The suggestion module 155*c* may predict the intent of the user to recommend an instruction to the user. For example, the suggestion module 155*c* may recommend an instruction to the user in consideration of the current state (e.g., a time, a place, context, or an app) of the user.

Figure 3:
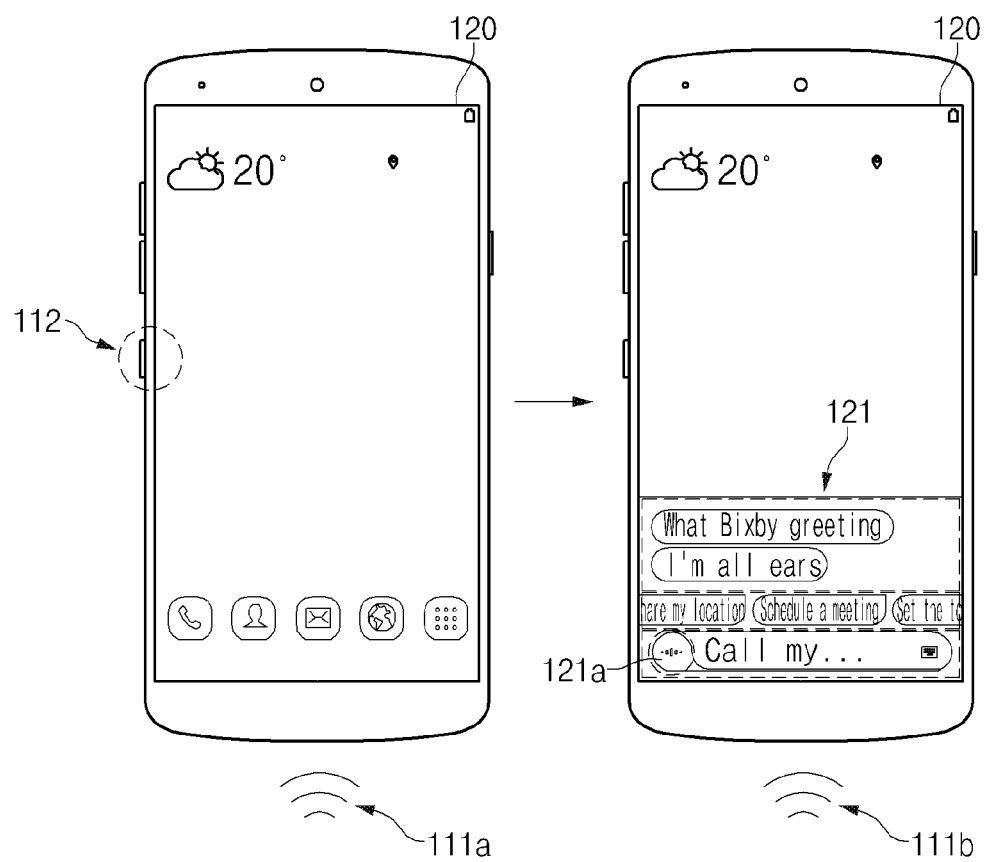
FIG. 3 is view illustrating that an intelligence app of a user terminal is executed, according to an embodiment of the disclosure.

FIG. 3 is view illustrating that an intelligence app of a user terminal is executed, according to an embodiment of the disclosure.

FIG. 3 illustrates that the user terminal 100 receives a user input to execute an intelligence app (e.g., a speech recognition app) operating in conjunction with the intelligence agent 151.

According to an embodiment, the user terminal 100 may execute the intelligence app for recognizing a voice through a hardware key 112. For example, when the user terminal 100 receives the user input through the hardware key 112, the user terminal 100 may display a UI 121 of the intelligence app in the display 120. For example, a user may touch a speech recognition button 121a of the UI 121 of the intelligence app for the purpose of entering a voice 11b in a state where the UI 121 of the intelligence app is displayed in the display 120. For another example, while continuously pressing the hardware key 112 to enter the voice 111b, the user may enter the voice 111b.

According to an embodiment, the user terminal 100 may execute the intelligence app for recognizing a voice through the microphone 111. For example, when a specified voice (e.g., wake up!) is entered 111a through the microphone 111, the user terminal 100 may display the UI 121 of the intelligence app in the display 120.

Figure 4:
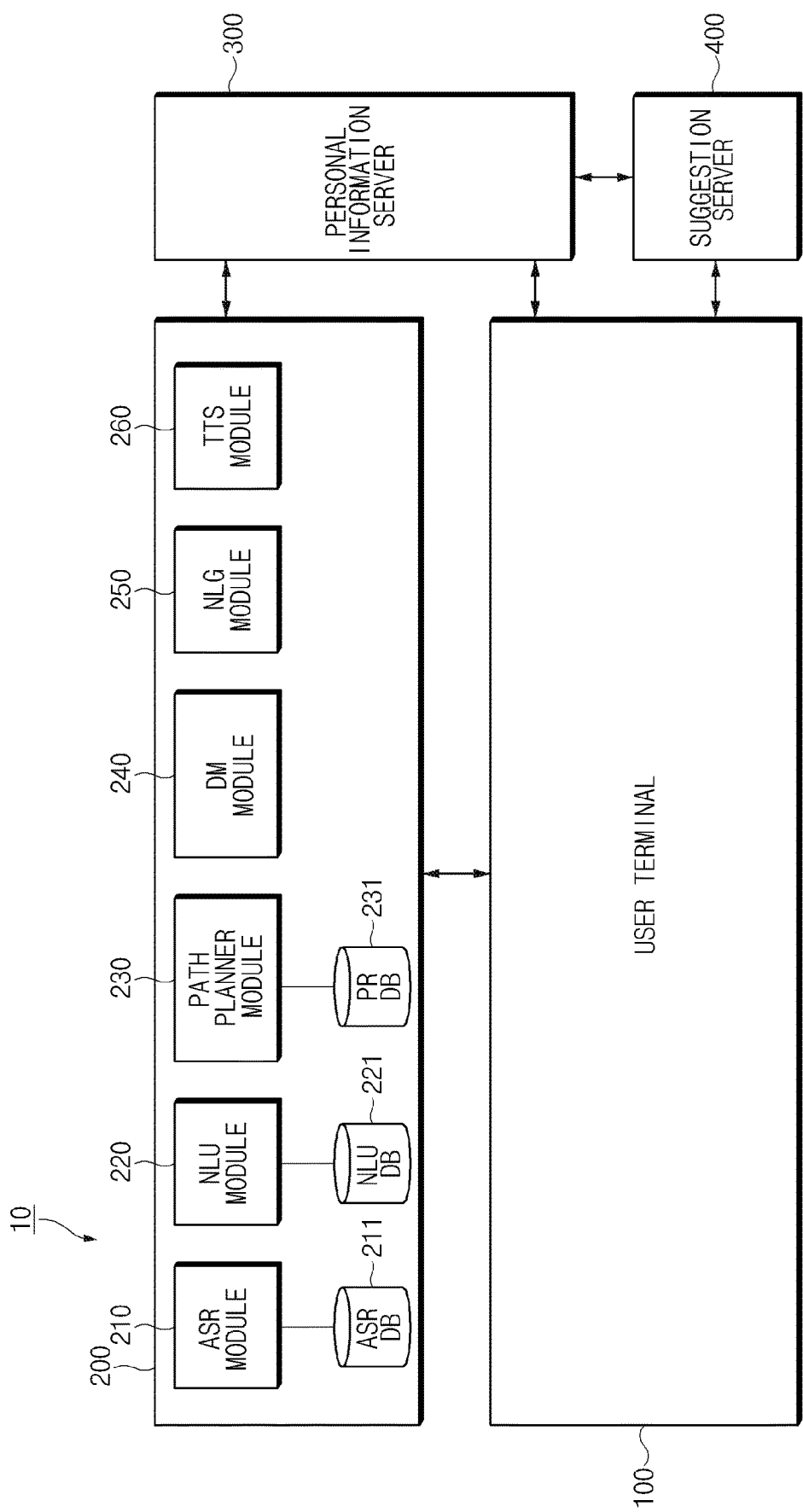
FIG. 4 is a block diagram illustrating an intelligence server of an integrated intelligence system, according to an embodiment of the disclosure.

FIG. 4 is a block diagram illustrating an intelligence server of an integrated intelligence system, according to an embodiment of the disclosure.

Referring to FIG. 4, the intelligence server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260.

The NLU module 220 or the path planner module 230 of the intelligence server 200 may generate a path rule.

According to an embodiment, the ASR module 210 may change the user input received from the user terminal 100 to text data.

According to an embodiment, the ASR module 210 may change the user input received from the user terminal 100 to text data. For example, the ASR module 210 may include an utterance recognition module. The utterance recognition module may include an acoustic model and a language model. For example, the acoustic model may include information associated with utterance, and the language model may include unit phoneme information and information about a combination of unit phoneme information. The utterance recognition module may change user utterance to text data by using the information associated with utterance and unit phoneme information. For example, the information about the acoustic model and the language model may be stored in an automatic speech recognition database (ASR DB) 211.

According to an embodiment, the NLU module 220 may grasp user intent by performing syntactic analysis or semantic analysis. The syntactic analysis may divide the user input into syntactic units (e.g., words, phrases, morphemes, and the like) and determine which syntactic elements the divided units have. The semantic analysis may be performed by using semantic matching, rule matching, formula matching, or the like. As such, the NLU module 220 may obtain a domain, intent, or a parameter (or a slot) necessary for the user input to express the intent.

According to an embodiment, the NLU module 220 may determine the intent of the user and parameter by using a matching rule that is divided into a domain, intent, and a parameter (or a slot) necessary to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in a natural language understanding database (NLU DB) 221.

According to an embodiment, the NLU module 220 may grasp the meaning of words extracted from a user input by using linguistic features (e.g., grammatical elements) such as morphemes, phrases, and the like and may match the meaning of the grasped words to the domain and intent to determine user intent. For example, the NLU module 220 may calculate how many words extracted from the user input is included in each of the domain and the intent, for the purpose of determining the user intent. According to an embodiment, the NLU module 220 may determine a parameter of the user input by using the words that are the basis for grasping the intent. According to an embodiment, the NLU module 220 may determine the user intent by using the NLU DB 221 storing the linguistic features for grasping the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed, based on the intent of the user input and may determine an action to be executed, in the selected app. The NLU module 220 may determine the parameter corresponding to the determined action to generate the path rule. According to an embodiment, the path rule generated by the NLU module 220 may include information about the app to be executed, the action to be executed in the app, and a parameter necessary to execute the action.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set for the purpose of determining the path rule.

According to another embodiment, the NLU module 220 may determine the app to be executed, the action to be executed in the app, and a parameter necessary to execute the action based on the intent of the user input and the parameter for the purpose of generating one path rule or a plurality of path rules. For example, the NLU module 220 may arrange the app to be executed and the action to be executed in the app by using information of the user terminal 100 depending on the intent of the user input in the form of ontology or a graph model for the purpose of generating the path rule. For example, the generated path rule may be stored in a path rule database (PR DB) 231 through the path planner module 230. The generated path rule may be added to a path rule set of the PR DB 231.

According to an embodiment, the NLU module 220 may select at least one path rule of the generated plurality of path rules. For example, the NLU module 220 may select an optimal path rule of the plurality of path rules. For another example, when only a part of action is specified based on the user utterance, the NLU module 220 may select a plurality of path rules. The NLU module 220 may determine one path rule of the plurality of path rules depending on an additional input of the user.

According to an embodiment, the NLU module 220 may transmit the path rule to the user terminal 100 in response to a request for the user input. For example, the NLU module 220 may transmit one path rule corresponding to the user input to the user terminal 100. For another example, the NLU module 220 may transmit the plurality of path rules corresponding to the user input to the user terminal 100. For example, when only a part of action is specified based on the user utterance, the plurality of path rules may be generated by the NLU module 220.

According to an embodiment, the path planner module 230 may select at least one path rule of the plurality of path rules.

According to an embodiment, the path planner module 230 may transmit a path rule set including the plurality of path rules to the NLU module 220. The plurality of path rules of the path rule set may be stored in the PR DB 231 connected to the path planner module 230 in the table form. For example, the path planner module 230 may transmit a path rule set corresponding to information (e.g., OS information or app information) of the user terminal 100, which is received from the intelligence agent 151, to the NLU module 220. For example, a table stored in the PR DB 231 may be stored for each domain or for each version of the domain.

According to an embodiment, the path planner module 230 may select one path rule or the plurality of path rules from the path rule set to transmit the selected one path rule or the selected plurality of path rules to the NLU module 220. For example, the path planner module 230 may match the user intent and the parameter to the path rule set corresponding to the user terminal 100 to select one path rule or a plurality of path rules and may transmit the selected one path rule or the selected plurality of path rules to the NLU module 220.

According to an embodiment, the path planner module 230 may generate the one path rule or the plurality of path rules by using the user intent and the parameter. For example, the path planner module 230 may determine the app to be executed and the action to be executed in the app based on the user intent and the parameter for the purpose of generating the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may determine whether the user intent grasped by the NLU module 220 is clear. For example, the DM module 240 may determine whether the user intent is clear, based on whether the information of a parameter is sufficient. The DM module 240 may determine whether the parameter grasped by the NLU module 220 is sufficient to perform a task. According to an embodiment, when the user intent is not clear, the DM module 240 may perform a feedback for making a request for necessary information to the user. For example, the DM module 240 may perform a feedback for making a request for information about the parameter for grasping the user intent.

According to an embodiment, the DM module 240 may include a content provider module. When the content provider module executes an action based on the intent and the parameter grasped by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the NLG module 250 may change specified information to a text form. Information changed to the text form may be a form of a natural language utterance. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to an embodiment, the TTS module 260 may change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 130

According to an embodiment, the NLU module 220, the path planner module 230, and the DM module 240 may be implemented with one module. For example, the NLU module 220, the path planner module 230 and the DM module 240 may be implemented with one module, may determine the user intent and the parameter, and may generate a response (e.g., a path rule) corresponding to the determined user intent and parameter. As such, the generated response may be transmitted to the user terminal 100.

Figure 5:
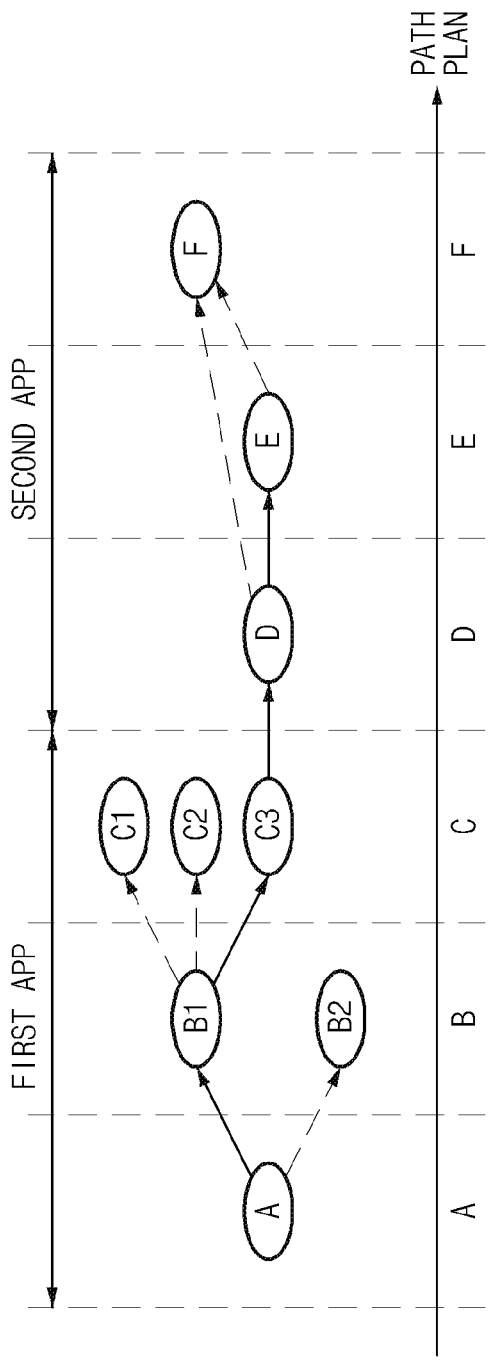
FIG. 5 is a view illustrating a path rule generating method of a path planner module, according to an embodiment of the disclosure.

FIG. 5 is a diagram illustrating a path rule generating method of a path planner module, according to an embodiment of the disclosure.

Referring to FIG. 5, according to an embodiment, the NLU module 220 may divide the function of an app into unit actions (e.g., A to F) and may store the divided unit actions in the PR DB 231. For example, the NLU module 220 may store a path rule set, which includes a plurality of path rules A-B1-C1, A-B1-C2, A-B1-C3-D-F, and A-B1-C3-D-E-F divided into unit actions, in the PR DB 231.

According to an embodiment, the PR DB 231 of the path planner module 230 may store the path rule set for performing the function of an app. The path rule set may include a plurality of path rules each of which includes a plurality of actions. An action executed depending on a parameter input to each of the plurality of actions may be sequentially arranged in the plurality of path rules. According to an embodiment, the plurality of path rules implemented in a form of ontology or a graph model may be stored in the PR DB 231.

According to an embodiment, the NLU module 220 may select an optimal path rule A-B1-C3-D-F of the plurality of path rules A-B1-C1, A-B1-C2, A-B1-C3-D-F, and A-B1-C3-D-E-F corresponding to the intent of a user input and the parameter.

According to an embodiment, when there is no path rule completely matched to the user input, the NLU module 220 may transmit a plurality of rules to the user terminal 100. For example, the NLU module 220 may select a path rule (e.g., A-B 1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may transmit the one or more path rules to the user terminal 100.

According to an embodiment, the NLU module 220 may select one of a plurality of path rules based on an input added by the user terminal 100 and may transmit the selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 for the purpose of transmitting the selected one path rule to the user terminal 100.

According to another embodiment, the NLU module 220 may determine the intent of a user and the parameter corresponding to the user input (e.g., an input for selecting C3) additionally entered by the user terminal 100 for the purpose of transmitting the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, the user terminal 100 may complete the actions of the apps 141 and 143 based on the selected one path rule.

According to an embodiment, when a user input in which information is insufficient is received by the intelligence server 200, the NLU module 220 may generate a path rule partly corresponding to the received user input. For example, the NLU module 220 may transmit the partly corresponding path rule to the intelligence agent 151 (①). The intelligence agent 151 may transmit the partly corresponding path rule to the execution manager module 153 (②), and the execution manager module 153 may execute the first app 141 depending on the path rule. The execution manager module 153 may transmit information about an insufficient parameter to the intelligence agent 151 while executing the first app 141 (③). The intelligence agent 151 may make a request for an additional input to a user by using the information about the insufficient parameter. When the additional input is received by the user, the intelligence agent 151 may transmit and process the additional input to the intelligence server 200 (④). The NLU module 220 may generate a path rule to be added, based on the intent of the user input additionally entered and parameter information and may transmit the path rule to be added, to the intelligence agent 151 (⑤). The intelligence agent 151 may transmit the path rule to the execution manager module 153 and may execute the second app 143 (⑥).

According to an embodiment, when a user input, in which a portion of information is missed, is received by the intelligence server 200, the NLU module 220 may transmit a user information request to the personal information server 300. The personal information server 300 may transmit information of a user entering the user input stored in a persona database to the NLU module 220. The NLU module 220 may select a path rule corresponding to the user input in which a part of an action is missed, by using the user information. As such, even though the user input in which a portion of information is missed is received by the intelligence server 200, the NLU module 220 may make a request for the missed information to receive an additional input or may determine a path rule corresponding to the user input by using user information.

Figure 6:
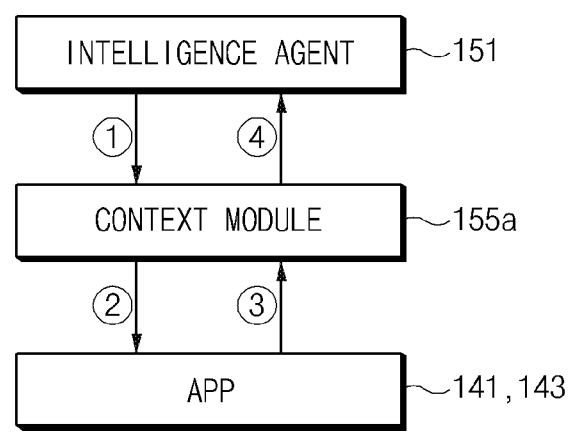
FIG. 6 is a block diagram illustrating that a context module of a processor collects a current state, according to an embodiment of the disclosure.

FIG. 6 is a block diagram illustrating that a context module of a processor collects a current state, according to an embodiment of the disclosure.

Referring to FIG. 6, when receiving a context request from the intelligence agent 151 (①), the context module 155a may make a request for context information indicating current states of the apps 141 and 143 to the apps 141 and 143 (②). According to an embodiment, the context module 155a may receive the context information from the apps 141 and 143 (③) and may transmit the context information to the intelligence agent 151 (④).

According to an embodiment, the context module 155a may receive pieces of context information through the apps 141 and 143. For example, the context information may be information about the most recently executed apps 141 and 143. For another example, the context information may be information (e.g., information about the corresponding picture when a user watches a picture through a gallery app) about the current states in the apps 141 and 143.

According to an embodiment, the context module 155a may receive context information indicating a current state of the user terminal 100 from a device platform as well as the apps 141 and 143. The context information may include general context information, user context information, or device context information.

The general context information may include general information of the user terminal 100. The general context information may be identified through an internal algorithm by receiving data through a sensor hub of the device platform or the like. For example, the general context information may include information about current time and space. For example, the information about the current time and space may include information about current time or a current location of the user terminal 100. The current time may be identified through the time on the user terminal 100, and the information about the current location may be identified through a global positioning system (GPS). For another example, the general context information may include information about physical motion. For example, the information about the physical motion may include information about walking, running, driving, or the like. The information about the physical motion may be identified through a motion sensor. In the case of the information about driving, the boarding and the parking may be identified by sensing Bluetooth connection in a vehicle as well as the driving is identified through the motion sensor. For another example, the general context information may include user activity information. For example, the user activity information may include information about commuting, shopping, travel, or the like. The user activity information may be identified by using information about a place where a user or an app registers in a database.

The user context information may include information about the user. For example, the user context information may include information about an emotional state of the user. For example, the information about the emotional state of the user may include information about happiness, sadness, anger, or the like of the user. For another example, the user context information may include information about the current state of the user. For example, the information about the current state of the user may include information about interest, intent, or the like (e.g., shopping).

The device context information may include information about the state of the user terminal 100. For example, the device context information may include information about a path rule that the execution manager module 153 performs. For another example, the device information may include information about a battery. For example, the information about the battery may be identified through charging and discharging states of the battery. For another example, the device information may include information about a connected device and a network. For example, the information about the connected device may be identified through a communication interface connected with the device.

Figure 7:
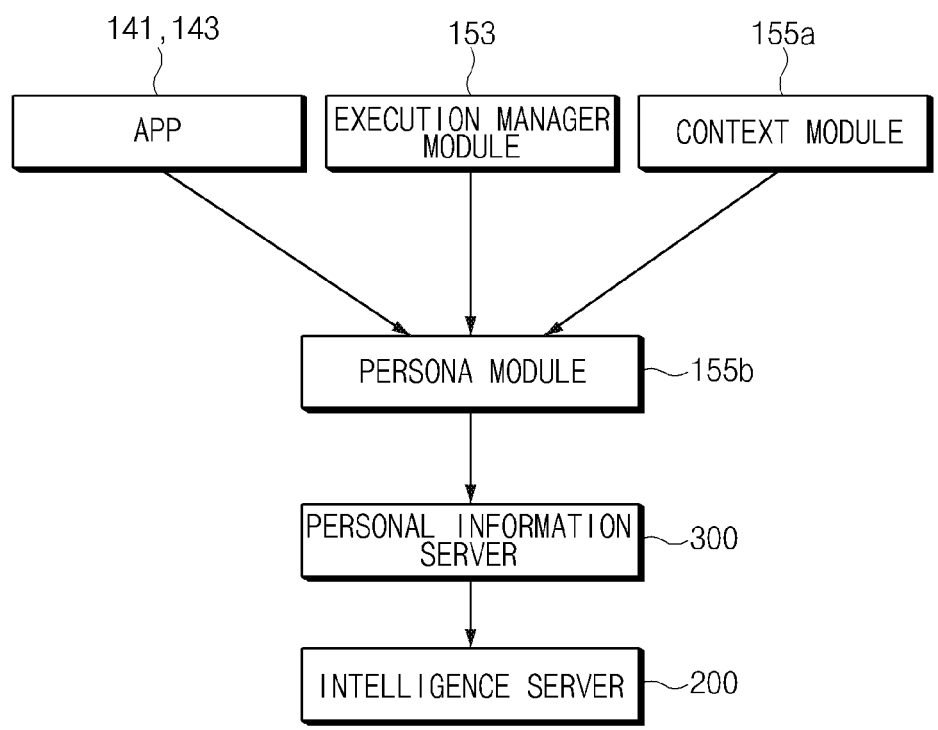
FIG. 7 is a block diagram illustrating that a persona module manages information of a user, according to an embodiment of the disclosure.

FIG. 7 is a block diagram illustrating that a persona module manages information of a user, according to an embodiment of the disclosure.

Referring to FIG. 7, the persona module 155b may receive information of the user terminal 100 from the apps 141 and 143, the execution manager module 153, or the context module 155a. The apps 141 and 143 and the execution manager module 153 may store information about the result obtained by executing the actions 141b and 143b of an app in an action log database. The context module 155a may store information about a current state of the user terminal 100 in a context database. The persona module 155b may receive the stored information from the action log database or the context database. For example, data stored in the action log database and the context database may be analyzed by an analysis engine and may be transmitted to the persona module 155b.

According to an embodiment, the persona module 155b may transmit information received from the apps 141 and 143, the execution manager module 153, or the context module 155a to the suggestion module 155c. For example, the persona module 155b may transmit the data stored in the action log database or the context database to the suggestion module 155c.

According to an embodiment, the persona module 155b may transmit the information received from the apps 141 and 143, the execution manager module 153, or the context module 155a to the personal information server 300. For example, the persona module 155b may periodically transmit the data, which is accumulated and stored in the action log database or the context database, to the personal information server 300.

According to an embodiment, the persona module 155b may transmit the data stored in the action log database or the context database to the suggestion module 155c. User information generated by the persona module 155b may be stored in a persona database. The persona module 155b may periodically transmit the user information stored in the persona database to the personal information server 300. According to an embodiment, the information transmitted to the personal information server 300 by the persona module 155b may be stored in the persona database. The personal information server 300 may estimate user information necessary to generate a path rule of the intelligence server 200 by using the information stored in the persona database.

According to an embodiment, the user information inferred by using information that the persona module 155b transmits may include profile information or preference information. The profile information or the preference information may be estimated through an account of the user and accumulated information.

The profile information may include personal information of the user. For example, the profile information may include population statistics information of the user. For example, the population statistics information may include gender, age, or the like of the user. For another example, the profile information may include life event information. For example, the life event information may be estimated by comparing log information with a life event model and may be strengthened by analyzing a behavior pattern. For another example, the profile information may include interest information. For example, the interest information may include shopping items of interest, interesting fields (e.g., sports, politics, and the like). For another example, the profile information may include activity area information. For example, the activity area information may include information about a house, a work place, or the like. The information about the activity area may include information about an area where a priority is recorded based on accumulated stay time and the number of visits as well as information about a location of a place. For another example, the profile information may include activity time information. For example, the activity time information may include information about a wakeup time, a commute time, a sleep time, or the like. The information about the commute time may be estimated by using the activity area information (e.g., information about a house and a work place). The information about the sleep time may be estimated through an unused time of the user terminal 100.

The preference information may include preference information of the user. For example, the preference information may include information about app preference. For example, the app preference may be estimated through a usage log (e.g., a time- and place-specific usage log) of an app. The app preference may be used to determine an app to be executed depending on a current state (e.g., time or place) of the user. For another example, the preference information may include information about contact preference. For example, the contact preference may be estimated by analyzing information about a contact frequency (e.g., a time- and place-specific frequency of contacting) of a contact. The contact preference may be used to determine a contact to be contacted depending on a current state (e.g., a contact for duplicate names) of the user. For another example, the preference information may include setting information. For example, the setting information may be estimated by analyzing information about setting frequency (e.g., a time- and place-specific frequency of setting a setting value) of a specific setting value. The setting information may be used to set a specific setting value depending on the current state (e.g., a time, a place, or context) of the user. For another example, the preference information may include place preference. For example, the place preference may be estimated through visit history (e.g., a time-specific visit history) of a specific place. The place preference may be used to determine a place to visit depending on the current state (e.g., time) of the user. For another example, the preference information may include instruction preference. For example, the instruction preference may be estimated through a usage frequency (e.g., a time- and place-specific usage frequency) of an instruction. The instruction preference may be used to determine an instruction pattern to be used depending on the current state (e.g., time or place) of the user. In particular, the instruction preference may include information about a menu most frequently selected by the user in the current state of an app being executed by analyzing the log information.

Figure 8:
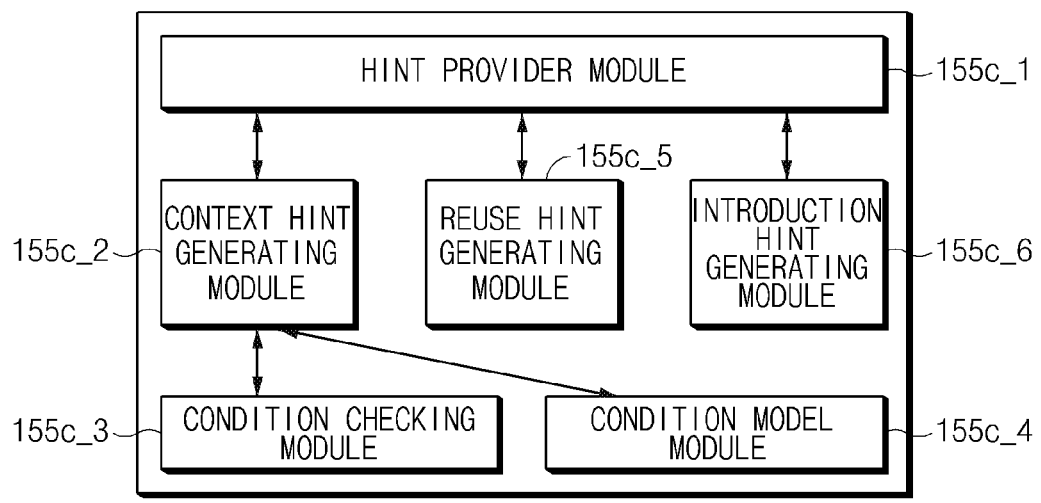
FIG. 8 is a block diagram illustrating a suggestion module, according to an embodiment of the disclosure.

FIG. 8 is a block diagram illustrating a suggestion module, according to an embodiment of the disclosure.

Referring to FIG. 8, the suggestion module 155c may include a hint provider module 155c_1, a context hint generating module 155c_2, a condition checking module 155c_3, a condition model module 155c_4, a reuse hint generating module 155c_5, or an introduction hint generating module 155c_6.

According to an embodiment, the hint provider module 155c_1 may provide a user with a hint. For example, the hint provider module 155c_1 may receive the generated hint from the context hint generating module 155c_2, the reuse hint generating module 155*c*_5, or the introduction hint generating module 155*c*_6, to provide the user with the hint.

According to an embodiment, the context hint generating module 155*c*_2 may generate a hint that is recommended depending on a current state through the condition checking module 155*c*3 or the condition model module 155*c*_4. The condition checking module 155*c*_3 may receive information corresponding to the current state through the intelligence service module 155, and the condition model module 155*c*_4 may set a condition model by using the received information. For example, the condition model module 155*c*4 may provide the user with a hint, which is likely to be used under the corresponding condition, in order of priority by determining a time, a location, context, an app being executed, or the like at a point in time when the hint is provided to the user.

According to an embodiment, the reuse hint generating module 155*c*_5 may generate a hint that is to be recommended depending on the current state and use frequency. For example, the reuse hint generating module 155*c*_5 may generate the hint in consideration of the use pattern of the user.

According to an embodiment, the introduction hint generating module 155*c*_6 may generate a hint for introducing a new function and a function, which is heavily utilized by another user, to the user. For example, the hint for introducing the new function may include introduction (e.g., an operating method) associated with the intelligence agent 151.

According to another embodiment, the personal information server 300 may include the context hint generating module 155*c*_2, the condition checking module 155*c*_3, the condition model module 155*c*_4, the reuse hint generating module 155*c*_5, or the introduction hint generating module 155*c*_6 of the suggestion module 155*c*. For example, the hint provider module 155*c*_1 of the suggestion module 155*c* may receive the hint from the context hint generating module 155*c*_2, the reuse hint generating module 155*c*_5, or the introduction hint generating module 155*c*_6 of the personal information server 300 to provide the user with the received hint.

According to an embodiment, the user terminal 100 may provide the hint depending on the following series of processes. For example, when receiving a hint providing request from the intelligence agent 151, the hint provider module 155*c*_1 may transmit a hint generating request to the context hint generating module 155*c*_2. When receiving the hint generating request, the context hint generating module 155*c*_2 may receive information corresponding to the current state from the context module 155*a* and the persona module 155*b* by using the condition checking module 155*c*_3. The condition checking module 155*c*_3 may transmit the received information to the condition model module 155*c*_4, and the condition model module 155*c*_4 may assign a priority to a hint among hints to be provided to the user, in order of high availability under a condition by using the information. The context hint generating module 155*c*_2 may identify the condition and may generate a hint corresponding to the current state. The context hint generating module 155*c*_2 may transmit the generated hint to the hint provider module 155*c*_1. The hint provider module 155*c*_1 may sort the hint depending on the specified rule and may transmit the hint to the intelligence agent 151.

According to an embodiment, the hint provider module 155*c*_1 may generate a plurality of context hints and may assign priorities to the plurality of context hints depending on the specified rule. According to an embodiment, the hint provider module 155*c*_1 may provide the user with a context hint, the priority of which is high, from among the plurality of context hints at first.

According to an embodiment, the user terminal 100 may suggest a hint according to the use frequency. For example, when receiving a hint providing request from the intelligence agent 151, the hint provider module 155*c*_1 may transmit a hint generating request to the reuse hint generating module 155*c*_5. If receiving the hint generating request, the reuse hint generating module 155*c*_5 may receive user information from the persona module 155*b*. For example, the reuse hint generating module 155*c*_5 may receive a path rule included in preference information of the user of the persona module 155*b*, a parameter included in the path rule, an execution frequency of an app, and information about time and space in which the app is used. The reuse hint generating module 155*c*_5 may generate a hint corresponding to the received user information. The reuse hint generating module 155*c*_5 may transmit the generated hint to the hint provider module 155*c*_1. The hint provider module 155*c*_1 may sort the hint and may transmit the hint to the intelligence agent 151.

According to an embodiment, the user terminal 100 may suggest a hint associated with a new function. For example, when receiving a hint providing request from the intelligence agent 151, the hint provider module 155*c*_1 may transmit a hint generating request to the introduction hint generating module 155*c*_6. The introduction hint generating module 155*c*_6 may transmit an introduction hint providing request to the suggestion server 400 and may receive information about a function to be introduced, from the suggestion server 400. For example, the suggestion server 400 may store the information about the function to be introduced, and a hint list associated with the function to be introduced may be updated by a service operator. The introduction hint generating module 155*c*6 may transmit the generated hint to the hint provider module 155*c*_1. The hint provider module 155*c*_1 may sort the hint and may transmit the hint to the intelligence agent 151.

As such, the suggestion module 155*c* may provide a user with a hint generated by the context hint generating module 155*c*_2, the reuse hint generating module 155*c*_5, or the introduction hint generating module 155*c*_6. For example, the suggestion module 155*c* may display the generated hint in an app operating the intelligence agent 151 and may receive an input for selecting the hint from the user through the app.

2. Partial Landing

Hereinafter, the partial landing that is a state where an action execution state of the execution manager module 153 is stopped will be described with reference to FIG. 9.

The partial landing means a state where an action is stopped while the action is performed until an action is capable of being performed based on the received parameter, when a parameter necessary to perform an action is missing or when a path rule is not further capable of being performed by the result of the action.

Figure 9:
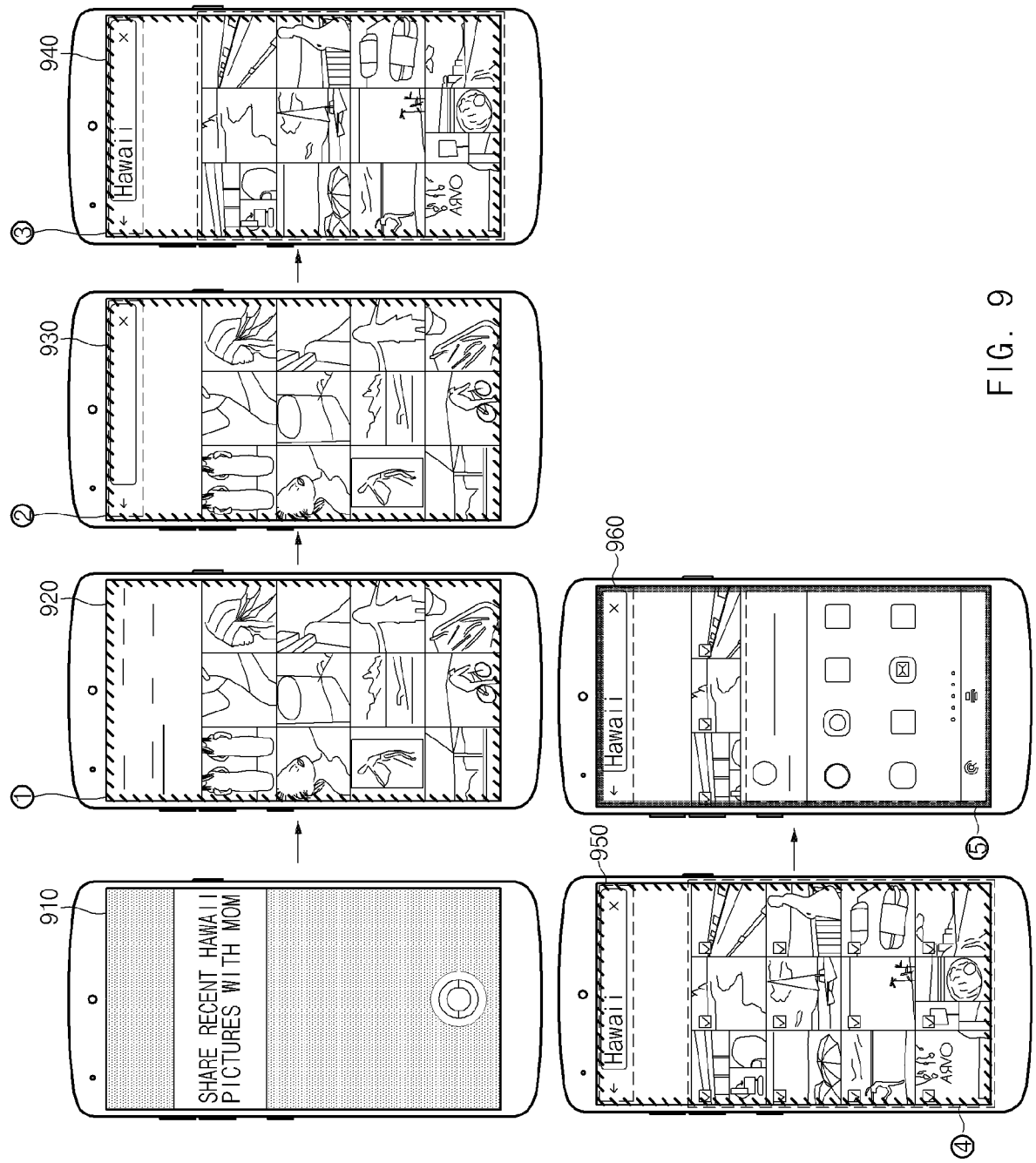
FIG. 9 is a view illustrating the case where a part of information is insufficient while a user terminal performs an action depending on a path rule, according to an embodiment of the disclosure.

FIG. 9 is a view illustrating the case where a part of information is insufficient while a user terminal performs an action depending on a path rule, according to an embodiment of the disclosure.

Referring to FIG. 9, a user may enter an utterance of "share recent Hawaii pictures with mom". The user terminal 100 may execute a gallery app, using the path rule corresponding to the user input in which a parameter is insufficient and may execute up to an action in which the shared screen is displayed. For example, the screen in which edge ①, edge ②, edge ③, and edge ④ are displayed in FIG. 9 may be a screen in which the action of an app is automatically executed by an integrated intelligence system. In addition, a screen in which edge ⑤ is displayed may be a screen for receiving the additional input of the user.

According to an embodiment, as in the exemplification in FIG. 9, the user terminal 100 may distinguish each execution state, using a method such as the background color, the adjustment of transparency, the display of an icon, or the like of a screen, as well as a method of differently displaying the edge of a screen to distinguish an execution state.

According to an embodiment, in screen 910, the user terminal 100 may receive the user's voice from a GUI for receiving a voice.

According to an embodiment, in screen 920, screen 930, screen 940, and screen 950 (a screen in which edge ①, edge ②, edge ③, and edge ④ are displayed), the user terminal 100 may automatically execute the first to fourth actions, using an integrated intelligence system service.

According to an embodiment, in screen 960 (a screen in which edge ⑤ is displayed), the user terminal 100 may execute the fifth action of displaying a screen for selecting the app to be shared on the display 120 and may maintain a state for receiving the user input. Because a parameter for selecting the means for sharing a picture is missing in the user utterance, the path rule may not be performed anymore in a state where screen 960 is displayed, and the state in which screen 960 is maintained is a partial landing state.

3. The Method of Obtaining an Additional Input and Performing a Path Rule in a Partial Landing State.

(1) The Action of Making a Request for an Additional User Input.

Hereinafter, a method of making a request for an additional user input in a partial landing state, receiving the additional user input, and performing a path rule according to the additional user input will be described with reference to FIGS. 10A to 11.

Figure 10A:
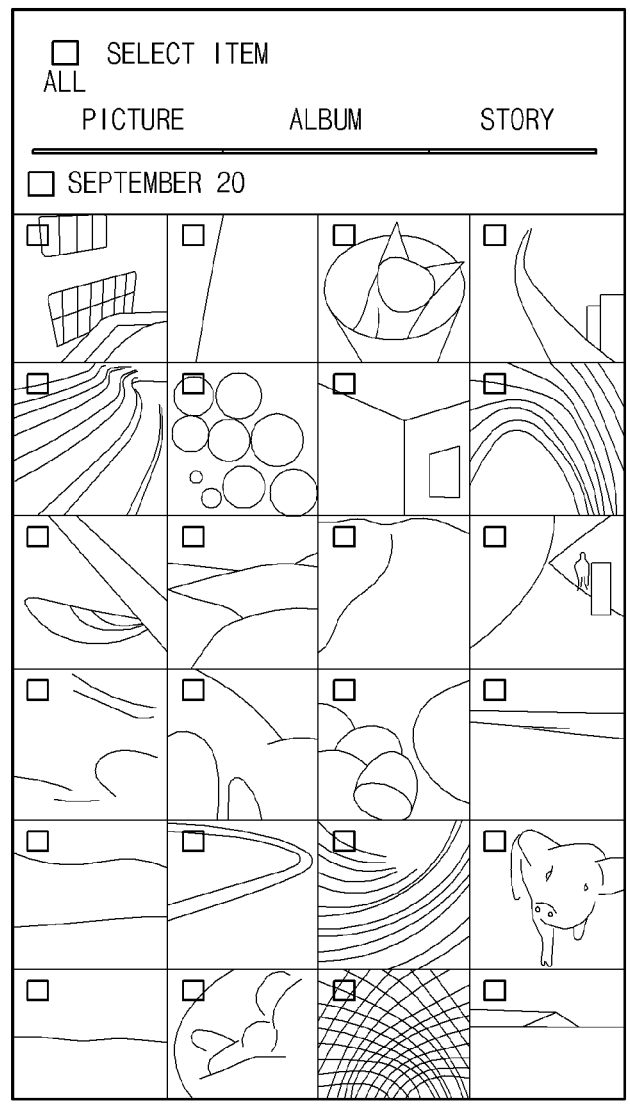
FIGS. 10A to 10C are views illustrating a screen in which a user terminal makes a request for an additional user input in a partial landing state and obtains a user input, according to an embodiment of the disclosure.
Figure 10B:
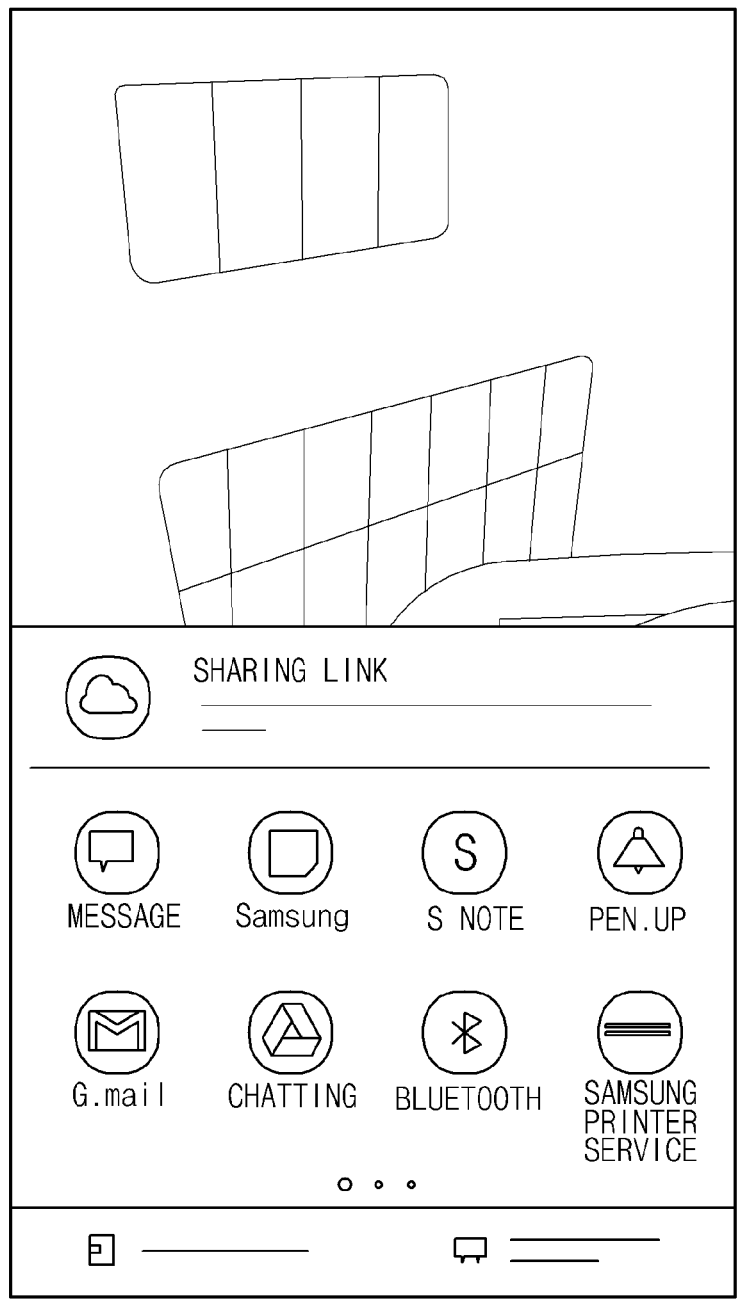
Figure 10C:
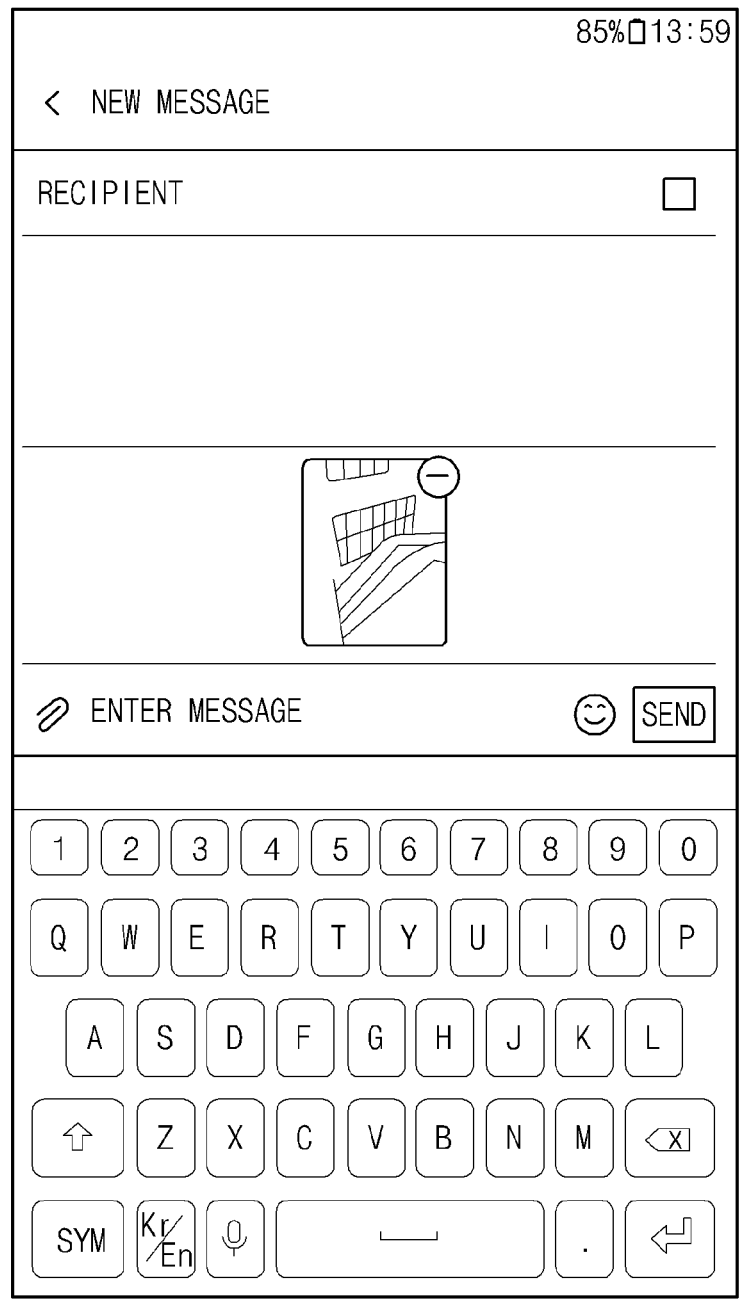

FIGS. 10A to 10C are views illustrating a screen in which a user terminal makes a request for an additional user input in a partial landing state and obtains a user input, according to an embodiment of the disclosure.

The user terminal 100 may land in the execution state defined in a path rule to may make a request for the additional input of a user. For example, the user terminal 100 may land in the execution state illustrated in FIG. 10A to display a picture list to be transmitted and may display 'select pictures to be transmitted' on the display 120 or may output 'select pictures to be transmitted' to the speaker 130.

When the user terminal 100 obtains an additional input to select pictures, the user terminal 100 may land in the execution state illustrated in FIG. 10B to display 'select means for sharing' on the display 120 or to output 'select means for sharing' to the speaker 130.

When the user terminal 100 obtains an utterance input of 'message', the user terminal 100 may execute a message app and may land in the execution state illustrated in FIG. 10C to display the message of 'select destinations' on the display 120 or to output the message of 'select destinations' to the speaker 130.

According to an embodiment, in a state where the user does not watch the screen of the user terminal 100, the user may enter an utterance, when the parameter necessary for an utterance input is missing, the user terminal 100 may be in a partial landing state. The user terminal 100 may output a user utterance input request through the speaker 130 to collect the missing parameter. For example, the user terminal 100 may output the voice message of 'select means for sharing' through the speaker 130 and may receive the utterance input of 'message' to fill the missing parameter.

Figure 11:
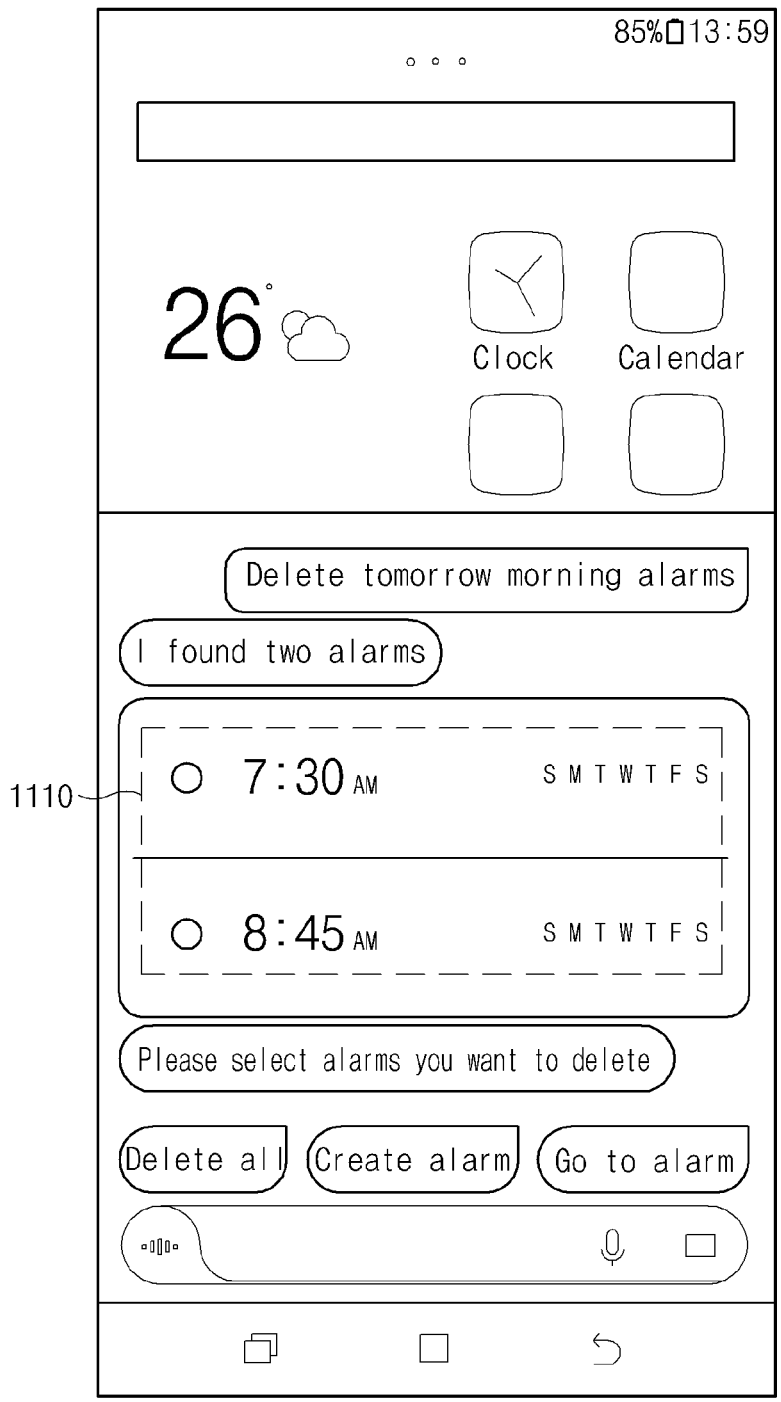
FIG. 11 is a view illustrating a screen for inducing the selection of a user when partial landing is made on a widget, according to an embodiment of the disclosure.

FIG. 11 is a view illustrating a screen for inducing the selection of a user when partial landing is made on a widget, according to an embodiment of the disclosure.

Referring to FIG. 11, the user terminal 100 has received a user input of 'delete an alarm tomorrow morning', but the user terminal 100 may be in the partial landing state while a path rule is performed on a widget because there are two alarms tomorrow morning. As illustrated in FIG. 11, the user terminal 100 may display a list 1110 of alarms, which can be a deletion target on the widget, without executing an alarm app and may allow an alarm to be selected.

In an embodiment, an app in the partial landing state may provide app state information to express a natural language for making a request for the additional input of a user. The app state information may be information associated with the partial landing state and may include an execution state ID indicating the partial landing state, parameter information obtained through an utterance before the partial landing state, missing parameter information, a parameter type, a parameter name, a parameter attribute name, a parameter attribute value, and the like. In an embodiment, the parameter name may be a "search keyword"; the parameter attribute name and the parameter attribute value may correspond to the case where there is no slot, the case where there is a slot but the slot is not valid, the case where slot filling is successful, the case where a slot is valid but there is no match in the slot, the case where a slot is valid but there is a need to select one because there are a lot of found results, or the like.

(2) The Action According to Reception of an Additional User Input

Hereinafter, the action of the integrated intelligence system 10 according to the call of an intelligence agent and the reception of a user utterance input will be described.

Figure 12:
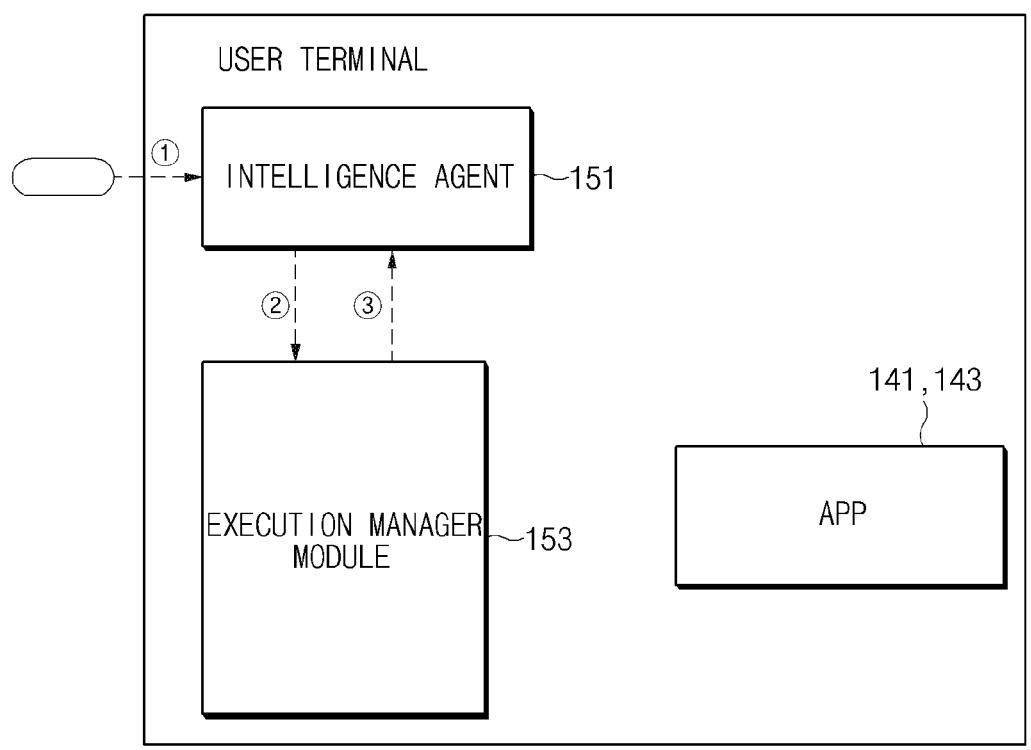
FIG. 12 is a view illustrating how an intelligence agent obtains the execution state of an app when the current execution state of an app is obtained by a user utterance input, according to an embodiment of the disclosure.

FIG. 12 is a view illustrating how an intelligence agent obtains the execution state of an app when the current execution state of an app is obtained by a user utterance input, according to an embodiment of the disclosure.

Referring to FIG. 12, when the intelligence agent 151 receives a call from a user (①), the intelligence agent 151 may make a request for context information indicating the current execution state of the app 141 or 143 to the execution manager module 153 (②). When the action of the app 141 or 143 is executed by a user utterance input, because the action of the app 141 or 143 is executed by the execution manager module 153, the execution manager module 153 may include context information indicating the execution state of the app 141 or 143. The execution manager module 153 may transmit context information to the intelligence agent 151 in response to the context information request of the intelligence agent 151. The context information may include an execution state ID; when the execution state of the app 141 or 143 is a partial landing state, the context information may include information about the path rule corresponding to the partial landing state.

Figure 13:
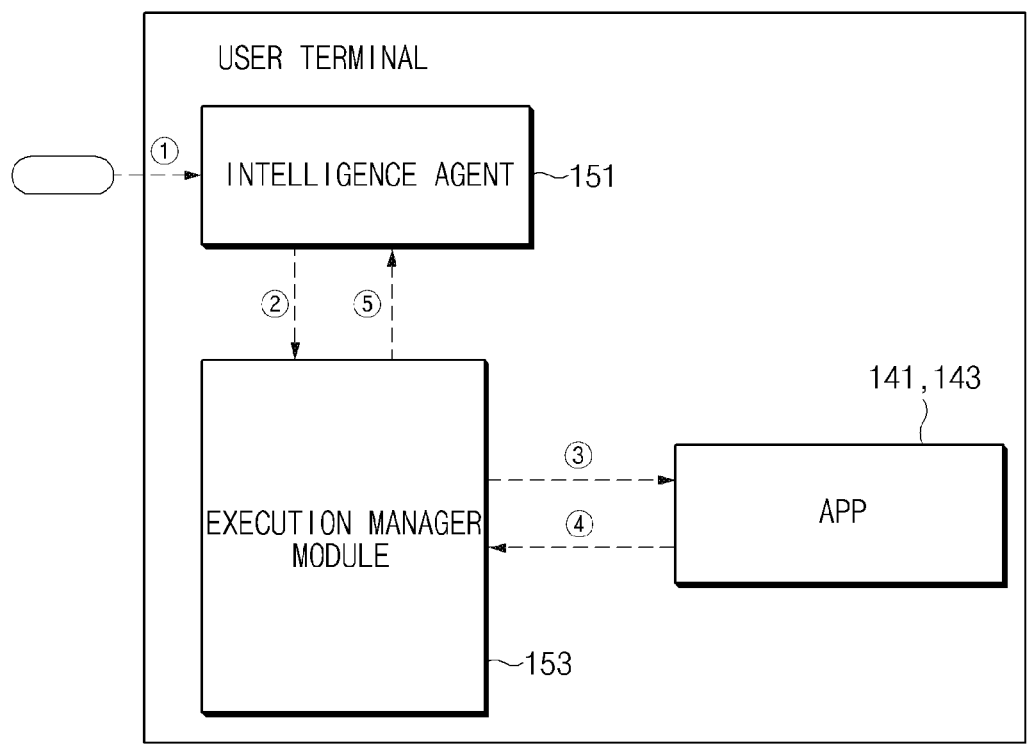
FIG. 13 is a view illustrating how an intelligence agent obtains the execution state when the current execution state is obtained by a touch input, according to an embodiment of the disclosure.

FIG. 13 is a view illustrating how an intelligence agent obtains the execution state when the current execution state is obtained by a touch input, according to an embodiment of the disclosure. In an embodiment, the touch input may be an input by another input device, such as a pen input, or the like.

Referring to FIG. 13, when the intelligence agent 151 receives a call from a user (①), the intelligence agent 151 may make a request for context information indicating the current execution state of the app 141 or 143 to the execution manager module 153 (②). When the action of the app 141 or 143 is executed by a touch input, because the action of the app 141 or 143 may be executed without going through the execution manager module 153, the execution manager module 153 may not include the current execution state of the app 141 or 143. The execution manager module 153 may make a request for the context information to the app 141 or 143 (③); the app 141 or 143 may transmit the context information including the current execution state to the execution manager module 153 (④); the execution manager module 153 may transmit the received context information to the intelligence agent 151 (⑤). The intelligence agent 151 may transmit the received context information to the intelligence server 200.

When receiving a user utterance input, the user terminal 100 may transmit the received user utterance input to the intelligence server 200. The NLU module 220 of the intelligence server 200 may generate the user's intent and a parameter based on the user utterance input. The NLU module 220 may transmit the user intent to the path planner module 230 and the path planner module 230 may transmit a new path rule, which is started based on the current execution state of the app 141 or 143, and the parameter generated based on the new user utterance to the user terminal 100.

(3) The Action of a User Terminal Based on the Newly Received Path Rule

The execution manager module 153 of the user terminal 100 may perform the action according to the user's intent and the parameter, based on the received path rule.

In an embodiment, the execution manager module 153 may perform the second path rule, by comparing a first path rule, which has been performed previously, with the newly received second path rule. According to an embodiment, the execution manager module 153 may not perform the action, which has been already performed depending on the first path rule, from among actions of the second path rule. For example, when the first path rule is composed of action 1 to action 5 and when the second path rule is composed of action 1, action 2, action 4, action 5, and action 7, the execution manager module 153 may first perform action 4 without performing action 1 and action 2, which are already performed depending on the first path rule, when performing the second path rule.

For another example, the execution manager module 153 may perform all the actions of the second path rule but may not display the execution screen according to the action corresponding to at least part of actions of the first path rule, on the display 120.

In other words, after performing action 1 to action 3 depending on the first command, when receiving the second command for performing action 1, action 2, action 4, action 5 and action 7, the conventional user terminal performs action 1 again. On the other hand, even when receiving the second command not associated with the first command, the user terminal 100 according to an embodiment of the disclosure may first perform action 4 without performing action 1 and action 2, which are already performed depending on the first command.

4. A Method of Performing a Path Rule According to a User Input Received after Partial Landing Hereinafter, the action in which the user terminal 100 receives a first user utterance to perform partial landing will be described to explain the overall operation of performing the path rule according to the additional user utterance after the partial landing before the user terminal 100 performs the partial landing. In other words, the first user utterance is a user utterance before the additional input described in '3. The method of obtaining an additional input to fill a missing parameter in a partial landing state'. Next, the exemplification of a method in which the user terminal 100 performs a path rule depending on the additional user input will be described.

(1) The Action According to the Reception of a First User Utterance Causing Partial Landing Hereinafter, the action of the integrated intelligence system 10 in the case where the user terminal 100 receives a first user utterance causing a partial landing state to perform partial landing will be described. The user terminal 100 included in the integrated intelligence system 10 may perform at least one task, using an application program, and the intelligence server 200 may include a plurality of path rules including each sequence of action states for the user terminal 100 performing a task.

Figure 14:
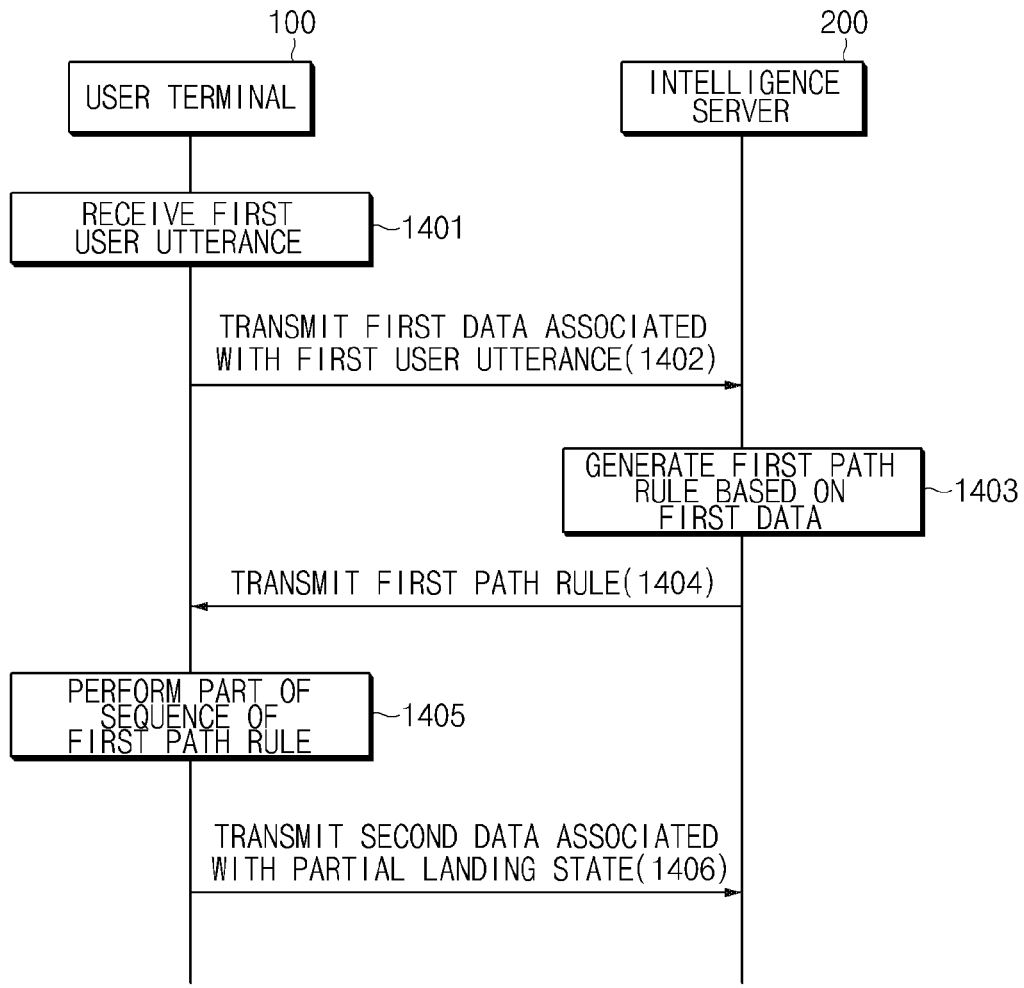
FIG. 14 is a flowchart illustrating a procedure in which a user terminal of an integrated intelligence system perform partial landing depending on the reception of a first user utterance, according to an embodiment of the disclosure.

FIG. 14 is a flowchart illustrating a procedure in which the user terminal 100 of an integrated intelligence system performs partial landing depending on the reception of a first user utterance, according to an embodiment of the disclosure.

In operation 1401, the user terminal 100 may receive a first user utterance through a microphone. According to an embodiment, the first user utterance may include a first request for performing a first task requiring one or more first parameters for the execution. The first user utterance may not include all the one or more first parameters. For example, the first user utterance may miss a part of the first parameters required by the first task.

In operation 1402, the user terminal 100 may transmit first data associated with the first user utterance to the intelligence server 200 through a communication circuit. According to an embodiment, in operation 1401, the user terminal 100 may receive the first user utterance as a voice signal and may transmit the voice signal according to the first user utterance, to the intelligence server 200.

In operation 1403, the NLU module and the path planner module 230 of the intelligence server 200 may generate a first path rule based on the received first data. According to an embodiment, the ASR module of the intelligence server 200 may convert the received voice signal into text data. The NLU module may obtain a domain, an intent, and a first parameter necessary to express the intent, from the converted text data. The NLU module may grasp a user's intent from the obtained domain, the obtained intent, and the obtained first parameter. The path planner module 230 may generate a first path rule, using the user intent grasped from the NLU module. In an embodiment, the first path rule may include the first sequence of action states for performing the first task.

In operation 1404, the intelligence server 200 may transmit the first path rule to the user terminal 100 through a communication circuit.

In operation 1405, the user terminal 100 may perform partial landing after performing a part of the first sequence of the received first path rule. According to an embodiment, while sequentially displaying action states on the display 120, the user terminal 100 may perform partial landing after performing not all but part of the first sequence of action states included in the first path rule generated based on the first user utterance. For example, the user terminal 100 may perform only the first sequence capable of performing using the first parameter, which is included in the first user utterance, in the first sequence of the first path rule. Furthermore, the user terminal 100 may stop the execution of the first sequence in the action state of the first sequence requiring the missing first parameter and may display the screen of the stopped state.

In operation 1406, the user terminal 100 may transmit second data associated with a partial landing state to the intelligence server 200 through a communication circuit. According to an embodiment, the user terminal 100 may transmit the second data associated with the partial landing state caused from the execution of the part of the first sequence, to the intelligence server 200. The second data associated with the partial landing state may include a user interface displayed on the display 120 in the partial landing state, the ID indicating the action state that is the partial landing state, the first parameter and the first path rule used to perform the first sequence, or the like.

(2) The Action According to the Reception of a User Input to Supplement a Missing Parameter in a Partial Landing State Hereinafter, the action of the integrated intelligence system 10 in the case where the user terminal 100 of the partial landing state receives a user input will be described.

Figure 15A:
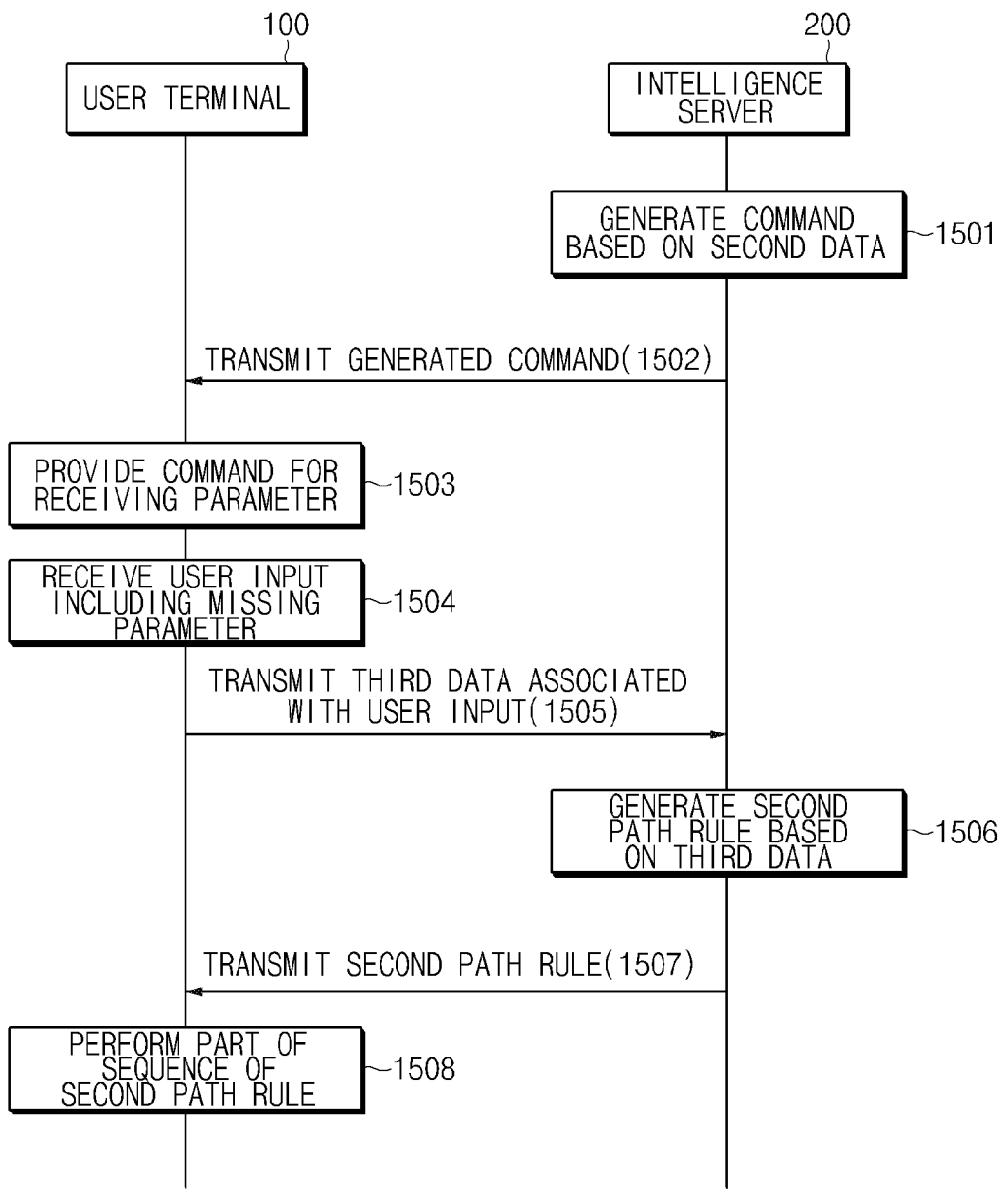
FIG. 15A is a flowchart illustrating a procedure in which a user terminal in a partial landing state receives a user input to perform a task.

FIG. 15A is a flowchart illustrating a procedure in which the user terminal 100 in a partial landing state receives a user input to perform a task.

In operation 1501, the NLG module 250 and the TTS module 250 of the intelligence server 200 may generate commands based on second data. According to an embodiment, the commands may receive a first parameter, which is missing from a first user utterance received to perform the first task, from a user. The NLG module 250 may generate text data for making a request for the information about the missing first parameter, based on the second data, and the TTS module 260 may convert the generated text data into a voice signal.

In operation 1502, the intelligence server 200 may transmit the generated commands to the user terminal 100 through a communication circuit. According to an embodiment, the intelligence server 200 may transmit the generated text data and/or voice signal to the user terminal 100.

In operation 1503, the user terminal 100 may provide commands for receiving a parameter through the display 120 or a speaker. According to an embodiment, the user terminal 100 may output the received text data to the display 120 or may output the received voice signal through the speaker. However, the user terminal 100 may directly generate the commands to provide the commands.

In operation 1504, the user terminal 100 may receive a user input including the missing first parameter, through a microphone or a user interface on the display 120. According to an embodiment, the user input through the microphone may be a voice input including the missing first parameter and may be a touch input to the user interface displayed on the display 120.

In operation 1505, the user terminal 100 may transmit third data associated with a user input to the intelligence server 200 through a communication circuit. According to an embodiment, the user terminal 100 may transmit a voice signal according to the voice input received in operation 1504 or may transmit the signal generated based on the touch input of a user in operation 1504.

In operation 1506, the NLU module and the path planner module 230 of the intelligence server 200 may generate a second path rule based on the received second data and third data. According to an embodiment, the NLU module 220 may generate the user's intent and the parameter based on the second data and the third data and may transmit the user's intent and the parameter to the path planner module 230. The path planner module 230 may generate the second path rule based on the user's intent and the parameter. Because the second path rule is generated based on the user input including the missing first parameter, the second path rule may include a part of the first sequence for performing the first task. According to an embodiment, the second path rule may be the same as the first path rule.

In operation 1507, the intelligence server 200 may transmit the second path rule to the user terminal 100 through a communication circuit.

In operation 1508, the user terminal 100 may perform a part of the sequence of the received second path rule. According to an embodiment, the user terminal 100 may determine whether the second path rule includes a part of the first sequence of already performed action states, for the second path rule to perform the first task. When the second path rule includes a part of the already performed first sequence, the user terminal 100 may not repeat a part of the already performed first sequence but perform the first task based on the second path rule. For example, the user terminal 100 may supplement the first parameter missing in the partial landing state to perform the first task.

Hereinafter, an embodiment in which the user terminal 100 operates depending on above-described operation 1401 to operation 1406 and operation 1501 to operation 1508 will be described with reference to FIG. 15B.

Figure 15B:
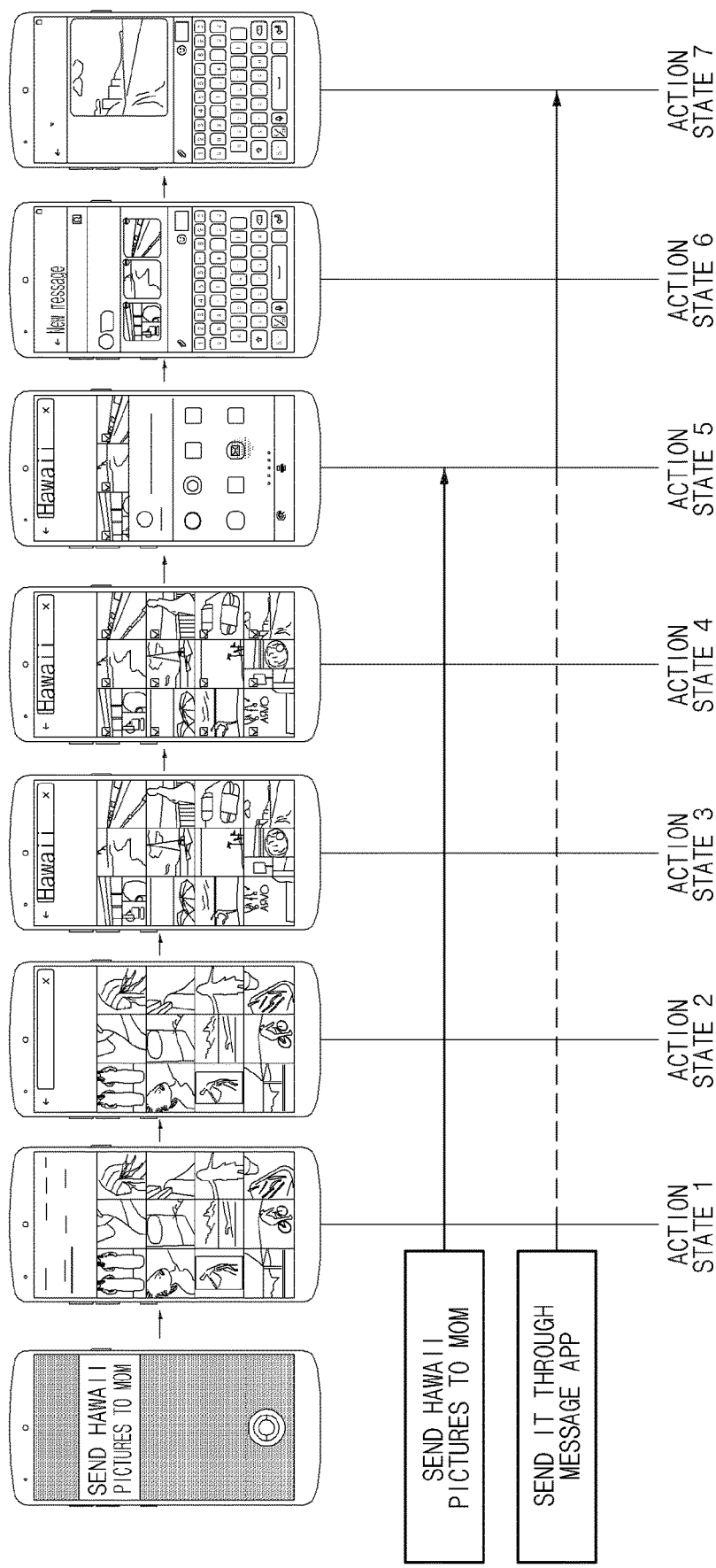
FIG. 15B is a view illustrating the case where a user terminal receives a first user utterance to perform partial landing and receives a user input to perform the first task, according to an embodiment of the disclosure.

FIG. 15B is a view illustrating the case where the user terminal 100 receives a first user utterance to perform partial landing and receives a user input to perform the first task, according to an embodiment of the disclosure.

In the embodiment according to FIG. 15B, the user terminal 100 may receive the first user utterance of "send Hawaii pictures to Mom" (operation 1401). The information about which app will be used to send pictures may be insufficient in the first user utterance. For example, the first parameter associated with the means to transmit a picture may be missing.

The user terminal 100 may transmit first data associated with the received first user utterance of "send Hawaii pictures to Mom" to the intelligence server 200 (operation 1402).

The user terminal 100 may receive a first path rule including the sequence of action states 1 to 7 (operation 1404).

As illustrated in FIG. 15B, while displaying the action state of the first path rule on the display 120, the user terminal 100 may perform an action 1 of executing a gallery app depending on the first path rule corresponding to the first user utterance in which a parameter is insufficient, an action 2 of performing the search function of the gallery app, an action 3 of searching for a picture in the gallery app, an action 4 of selecting the picture to be transmitted, and an action 5 in which the transmission screen is displayed (operation 1405). The user terminal 100 stops the action execution in the action state 5, and the action state 5 in which the action execution is stopped is a partial landing state.

The user terminal 100 may transmit the second data associated with the action state 5 to the intelligence server 200 (operation 1406). The data associated with the action state 5 may include a user interface displayed on the display 120, an ID indicating the action state 5, a parameter used from the action state 1 to the action state 5, and the first path rule.

The user terminal 100 may make a request for an additional input to a user to determine which app will be used to send pictures (operation 1503). As illustrated in FIG. 15B, the user terminal 100 may display the list of apps to be used to transmit pictures, on the display 120.

The user terminal 100 may receive a user input of "send it through a message app" as a voice signal (operation 1504).

The user terminal 100 may transmit the received user input of "send it through a message app" to the intelligence server 200 (operation 1505).

The user terminal 100 may receive a second path rule including the sequence of action states 1 to 7 (operation 1507). According to an embodiment, the second path rule may be generated based on a user interface displayed on the action state 5, an ID indicating the action state 5, a parameter used from the action state 1 to the action state 5, the first path rule, and a user input of "send it through a message app". Like the first path rule, the second path rule may include the sequence of action states 1 to 7; unlike the first path rule, the second path rule may further include a parameter of sending pictures using a message app in the action state 5.

The user terminal 100 may not perform action 1 to action 5, which are already performed to perform the first task, from among actions of the second path rule, but perform action 6 of executing a dialog window of a message app and entering the selected picture into the dialog window and action 7 of transmitting the entered picture (operation 1508).

The above-described embodiment will be described in comparison with the conventional user terminal. When receiving a user utterance input of "send Hawaii pictures to Mom", the conventional user terminal may output a message for making a request for an additional input such as "which application will be used to send it?" to obtain all parameters for performing a task. After receiving a user utterance input of "send it through a message app", the conventional user terminal starts to perform a task. In other words, until the conventional user terminal obtains all the parameters for performing a task, the conventional user terminal may not perform any action for performing the task.

Unlike this, when receiving a user utterance input of "send Hawaii pictures to Mom", the user terminal 100 according to an embodiment of the disclosure may obtain a user's intent and a parameter from the received user utterance input. The user terminal 100 according to an embodiment of the disclosure may perform an action of selecting Hawaii pictures in a gallery app and an action of displaying a screen for selecting an app that transmits pictures, depending on a path rule generated using the obtained user intent and the obtained parameter. When receiving a user utterance input of "send it to my sister through a message app", the user terminal 100 according to an embodiment of the disclosure may skip an action of selecting Hawaii pictures in the gallery app and may perform an action of transmitting the selected Hawaii pictures to Mom and sister, using the message app. In other words, after the user terminal 100 according to an embodiment of the disclosure performs an action capable of being performed using a user utterance input even when receiving a user utterance input in which the parameter for performing a task is missing, the user terminal 100 may skip the already performed action depending on an additional user utterance input and then may further perform the follow-up action.

(3) The Action According to the Reception of a Second User Utterance Input Associated With a First User Utterance Input after Performing a Path Rule.

Hereinafter, the action of the integrated intelligence system 10 when receiving a new user utterance input associated with the performed first task, after the user terminal 100 performs a first task will be described.

Figure 16A:
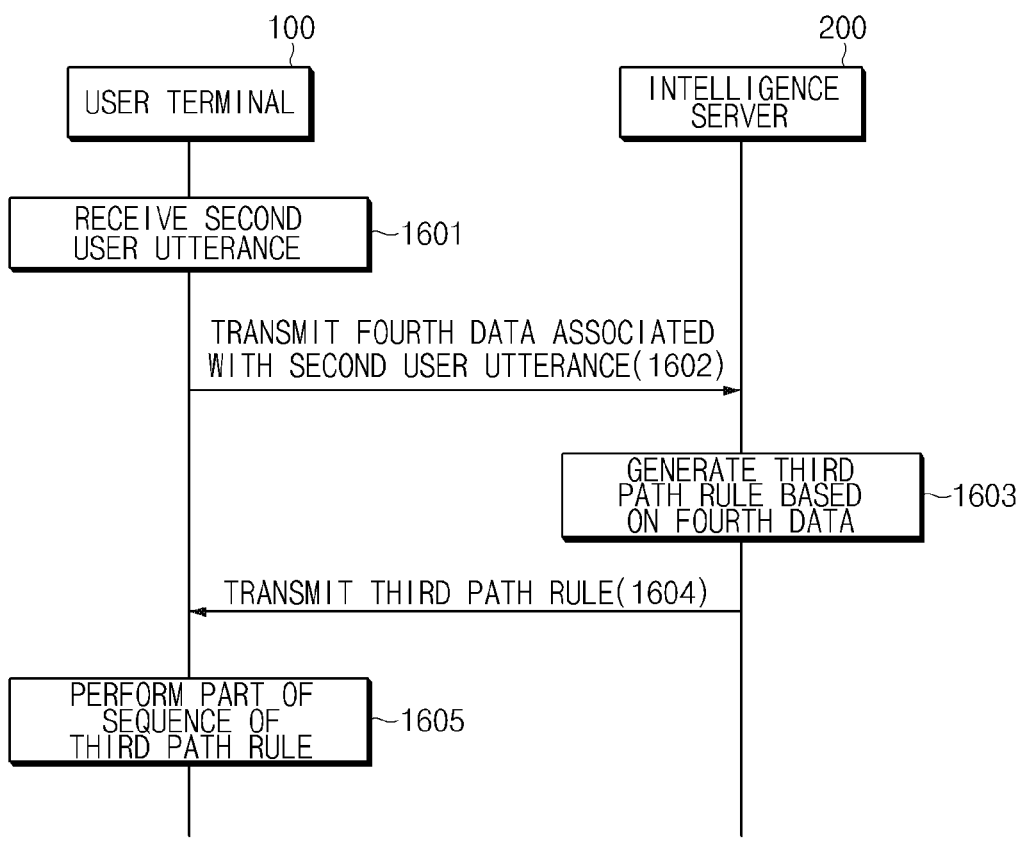
FIG. 16A is a flowchart illustrating a procedure in which a user terminal performing a first task receives an additional user utterance associated with a first task to perform a new task, according to an embodiment of the disclosure.

FIG. 16A is a flowchart illustrating a procedure in which the user terminal 100 performing the first task receives an additional user utterance associated with a first task to perform a new task, according to an embodiment of the disclosure.

In operation 1601, the user terminal 100 may receive a second user utterance through the microphone 111. According to an embodiment, after performing the first task, the user terminal 100 may receive a second user utterance associated with the first task. The second user utterance may include a second request for performing a second task requiring one or more second parameters for execution. Moreover, the second user utterance may not include all of the one or more second parameters and may include at least one first parameter for performing the first task. For example, the second user utterance may miss a part of the second parameters required by the second task and may include a part of the first parameters required by the first task.

In other words, unlike the first user utterance for performing the first task, the second user utterance of FIG. 16A is a user utterance for performing the second task. Furthermore, unlike the additional user input for filling the missing parameter in the partial landing state to perform the first task, the second user utterance is a user utterance received after the first task is performed. In the embodiment given with reference to FIG. 16A, after receiving a user utterance or a user input for performing the first task, the user terminal 100 may recognize an additional user utterance received within a specific time, as the second user utterance associated with the first task.

In operation 1602, the user terminal 100 may transmit fourth data associated with the second user utterance to the intelligence server 200 through a communication circuit. In an embodiment, the fourth data may be a voice signal corresponding to the second user utterance. According to an embodiment, the fourth data may further include a user interface displayed on the display 120 after performing the first task, an ID indicating an action state, a first parameter used to perform the first task, a second path rule used to perform the first task, or the like.

In operation 1603, the NLU module and the path planner module 230 of the intelligence server 200 may generate a third path rule based on the received fourth data. According to an embodiment, the NLU module 220 may generate the user's intent and the parameter based on the first user utterance and the second user utterance and may transmit the user's intent and the parameter to the path planner module 230. The path planner module 230 may generate a third path rule based on the user's intent, the parameter, and the fourth data, which are generated by the NLU module 220. In an embodiment, the third path rule may be generated based on the user's intent and the parameter, which are generated from the first user utterance for performing the first task; the third path rule may include a part of the first sequence for performing the first task.

In operation 1604, the intelligence server 200 may transmit the third path rule to the user terminal 100 through a communication circuit.

In operation 1605, the user terminal 100 may perform a part of the sequence of the received third path rule. According to an embodiment, the user terminal 100 may determine whether the third path rule includes a part of the first sequence of already performed action states, for the third path rule to perform the first task. When the third path rule includes a part of the already performed first sequence, the user terminal 100 may not repeat a part of the already performed first sequence but perform the second task based on the third path rule.

Hereinafter, an embodiment in which the user terminal 100 operates depending on above-described operation 1601 to operation 1605 will be described with reference to FIGS. 16B and 16C.

Figure 16C:
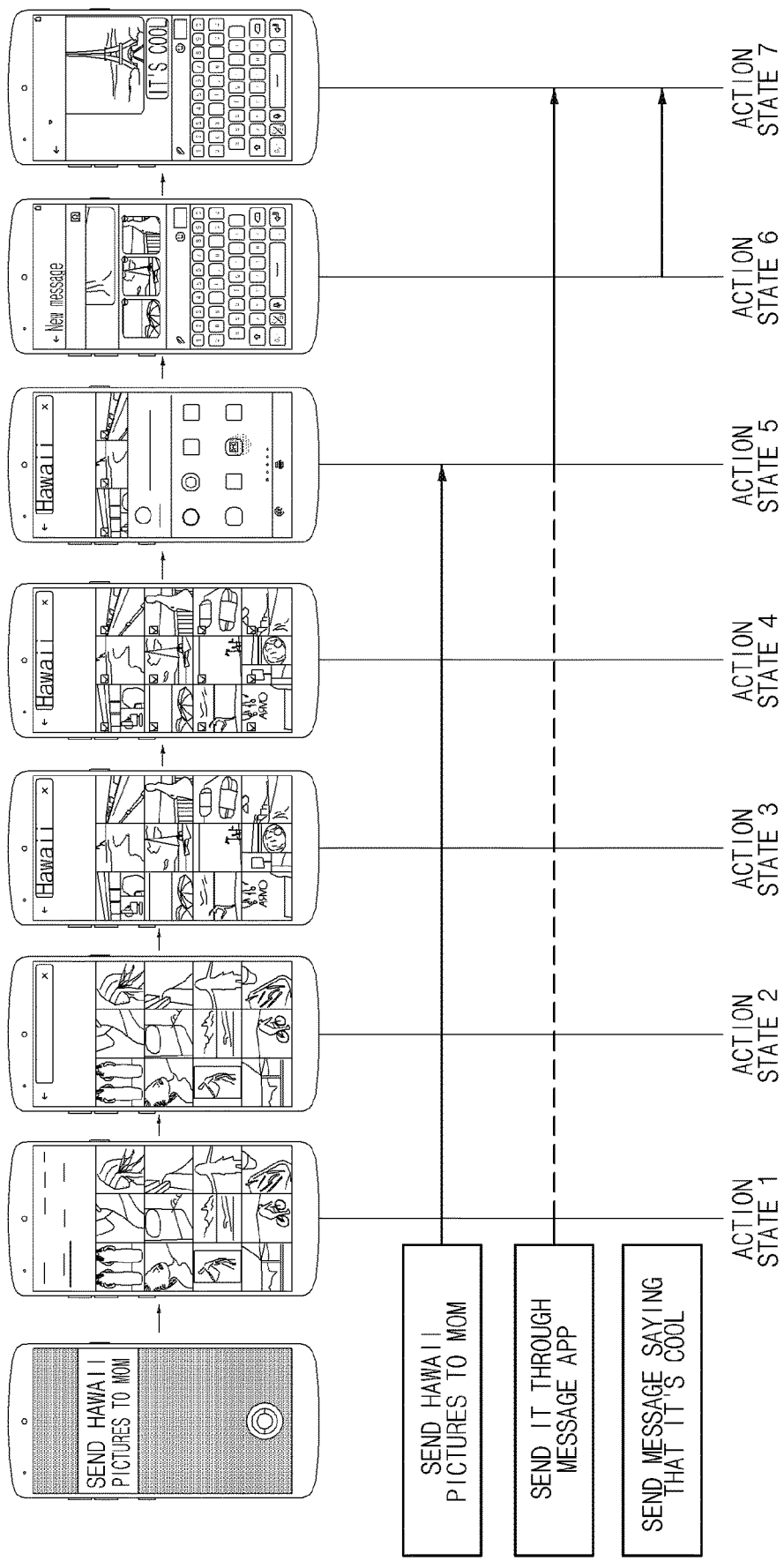

FIGS. 16B and 16C are views illustrating the case where the user terminal 100 receives a second user utterance to perform a second task after performing a first task, according to an embodiment of the disclosure.

In the embodiment according to FIG. 16B, after performing a first task, the user terminal 100 may receive a second user utterance of "send Paris pictures" (operation 1601). The information about who to send pictures or which app will be used to send pictures may be insufficient in the second user utterance. For example, the means to send pictures and the second parameter associated with a recipient may be missing. According to an embodiment, the second user utterance may include a common first parameter of 'send pictures' included in the first user utterance.

The user terminal 100 may transmit fourth data associated with the received second user utterance of "send Paris pictures" to the intelligence server 200 (operation 1602). According to an embodiment, the user terminal 100 may further transmit a user interface displayed on the action state 7 after the first task is performed, an ID indicating the action state 7, a parameter used from the action state 1 to the action state 7 of the first task, and data including the first path rule and the second path rule to the intelligence server 200.

The user terminal 100 may receive a third path rule including the sequence of action states 1 to 7 (operation 1604). According to an embodiment, the third path rule may be generated based on a user interface displayed on the action state 7 after the first task is performed, an ID indicating the action state 7, a parameter used from the action state 1 to the action state 7 of the first task, the first path rule, the second path rule, and a user input of "send Paris pictures".

The user terminal 100 may perform an action according to the received third path rule (operation 1605). According to an embodiment, the user terminal 100 may perform action 1 of executing a gallery app of the third path rule, action 2 of executing a search function of the gallery app, action 3 of searching for Paris pictures in the gallery app, action 4 of selecting a picture to be transmitted, action 5 in which a transmission screen is displayed, action 6 of attaching a selected picture in a message app, and an action of transmitting an attached picture in the message app.

In the embodiment according to FIG. 16C, after performing the first task, the user terminal 100 may receive a second user utterance of "send a message saying that it's cool" (operation 1601).

The user terminal 100 may transmit fourth data associated with the received second user utterance of "send a message saying that it's cool" to the intelligence server 200 (operation 1602). According to an embodiment, the user terminal 100 may further transmit a user interface displayed on the action state 7 after the first task is performed, an ID indicating the action state 7, a parameter used from the action state 1 to the action state 7 of the first task, and data including the first path rule and the second path rule to the intelligence server 200.

The user terminal 100 may receive a third path rule including the sequence of action states 1 to 7 (operation 1604). According to an embodiment, the third path rule may be generated based on a user interface displayed on the action state 7 after the first task is performed, an ID indicating the action state 7, a parameter used from the action state 1 to the action state 7 of the first task, the first path rule, the second path rule, and a user input of "send a message saying that it's cool".

The user terminal 100 may not perform a part of actions, which are already performed to perform the first task, from among actions of the received third path rule, but perform action 6 of executing a dialog window of a message app and entering a text of "it's cool" into the dialog window and action 7 of transmitting the entered text (operation 1605). According to an embodiment, the user terminal 100 may not repeat an action of executing the dialog window of the message app included in action 6 of executing the dialog window of the message app being an action, which is already performed to perform the first task, from among actions of the third path rule to enter the selected picture into the dialog window.

In another embodiment, after performing the first task that searches for Hawaii pictures in the gallery app depending on the first user utterance of "show Hawaii pictures" and then displays the found result on a display, the user terminal 100 may receive the second user utterance of "send this picture to Mom through a message app". The user terminal 100 may perform an action of executing the dialog window of a message app to attach the found Hawaii picture to the dialog window and an action of transmitting the attached picture, without performing an action of searching for Hawaii pictures in the gallery app and displaying the found result after receiving the second user utterance depending on above-described operation 1601 to operation 1605.

The above-described embodiment will be described in comparison with the conventional user terminal. The conventional user terminal may perform the first task that sends Hawaii pictures to Mom through a message app, depending on a user utterance input of "send Hawaii pictures to Mom through a message app". Next, when receiving a user utterance input of "also send Paris pictures", the conventional user terminal may output a message for making a request for an additional input such as "which application will be used to send it?" or "whom do you want to send it to?" to obtain a parameter for performing the second task. After receiving a user utterance input of "send it to Mom through a message app", the conventional user terminal starts to perform the second task that sends Paris pictures to Mom using the message app. In other words, when performing the second task according to the additional user utterance input, the conventional user terminal may not use information associated with the already performed first task.

The user terminal according to an embodiment of the disclosure may perform the first task that sends Hawaii pictures to Mom through a message app, depending on a user utterance input of "send Hawaii pictures to Mom through a message app". Next, the user terminal 100 according to an embodiment of the disclosure may receive a user utterance input of "also send Paris pictures". The user terminal 100 may perform the second task that sends Paris pictures to Mom using a message app, using the user intent and the parameter used to perform the first task.

In other words, even when receiving a user utterance input in which the parameter for performing a task is missing, the user terminal 100 according to an embodiment of the disclosure may perform a task, using information associated with the already performed task.

(4) The Action According to the Reception of a Second User Utterance Input not Associated with a First User Utterance Input in a Partial Landing State Hereinafter, the action of the integrated intelligence system 10 when the user terminal 100 in a partial landing state (a state where above-described operation 1401 to operation 1406 are performed) receives an additional user utterance input not associated with a first user utterance input causing partial landing will be described.

Figure 17A:
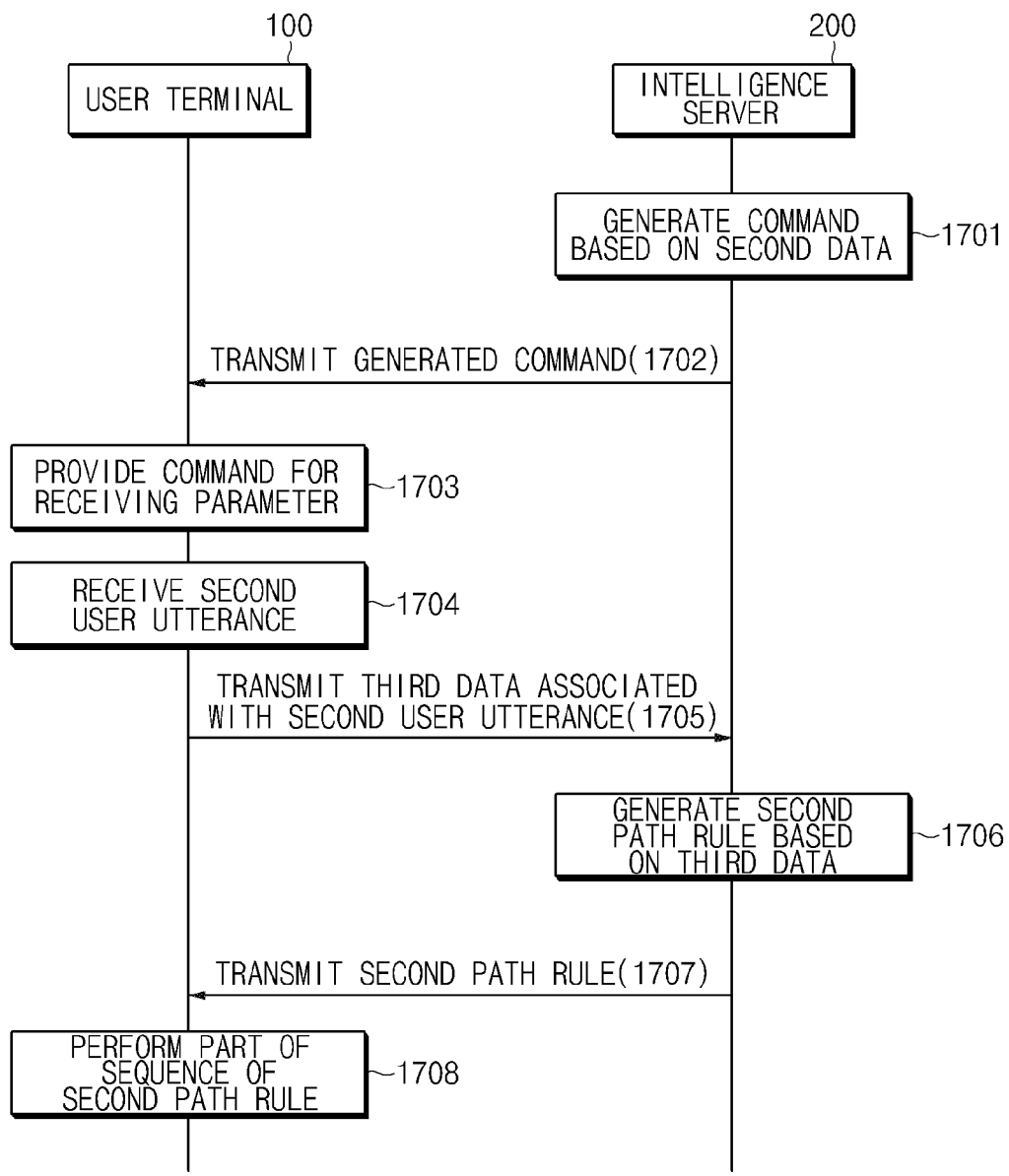
FIG. 17A is a flowchart illustrating a procedure in which a user terminal in a partial landing state receives a user utterance to perform a new task.

FIG. 17A is a flowchart illustrating a procedure in which the user terminal 100 in a partial landing state receives a user utterance to perform a new task.

In operation 1701, the NLG module 250 and the TTS module 260 of the intelligence server 200 may generate commands based on second data. Operation 1701 may correspond to above-described operation 1501.

In operation 1702, the intelligence server 200 may transmit the generated command to the user terminal 100 through a communication circuit. Operation 1702 may correspond to above-described operation 1502.

In operation 1703, the user terminal 100 may provide commands for receiving a parameter through the display 120 or a speaker. Operation 1703 may correspond to above-described operation 1503.

In operation 1704, the user terminal 100 may receive a second user utterance through the microphone 111. Unlike a user input of operation 1504 for filling the first parameter to perform the first task in a partial landing state, the second user utterance input in operation 1704 may not be associated with the first user utterance for performing the first task. The second user utterance may include a second request for performing a second task requiring one or more second parameters for execution. The second user utterance may not include all of the one or more second parameters and may include at least one first parameter. For example, the second user utterance may miss a part of the second parameters required by the second task and may include a part of the first parameters required by the first task.

In operation 1705, the user terminal 100 may transmit third data associated with the second user utterance to the intelligence server 200 through a communication circuit. According to an embodiment, the user terminal 100 may transmit the voice signal according to the second user utterance received in operation 1704.

In operation 1706, the NLU module and the path planner module 230 of the intelligence server 200 may generate a second path rule based on the received second data and third data. According to an embodiment, the NLU module 220 may generate the user's intent and the parameter based on the second data transmitted in operation 1406 and the third data transmitted in operation 1705 and may transmit the user's intent and the parameter to the path planner module 230. The path planner module 230 may generate the second path rule based on the user's intent and the parameter.

In operation 1506, the path planner module 230 may generate the second path rule based on the second user utterance input for filling the missing first parameter in the first path rule. Unlike this, in operation 1706, the path planner module 230 generates the second path rule based on the second user utterance input not associated with the first user utterance. In other words, unlike operation 1506 in which the path planner module 230 generates the second path rule for performing the first task, in operation 1706, the path planner module 230 may generate the second path rule for performing the second task.

In an embodiment, the path planner module 230 may further use the second data associated with the partial landing state as well as the third data associated with the second user utterance, to generate the second path rule for performing the second task. For example, when a part of second parameters for performing the second task is missing in the second user utterance, the path planner module 230 may use the first parameter included in the second data to fill the missing second parameter.

In operation 1707, the intelligence server 200 may transmit the second path rule to the user terminal 100 through a communication circuit.

In operation 1708, the user terminal 100 may perform a part of the sequence of the received second path rule. According to an embodiment, the user terminal 100 may determine whether the second path rule includes a part of the first sequence of already performed action states, for the second path rule to perform the first task. When the second path rule includes a part of the already performed first sequence, the user terminal 100 may not repeat a part of the already performed first sequence but perform the first task based on the second path rule. In other words, the user terminal 100 may not perform a part of the first sequence, which is already performed in the partial landing state, but perform the second task depending on the second path rule. For example, the user terminal 100 may perform partial landing after performing action 1 to action 3 among action 1 to action 4 included in the first path rule for performing the first task. When the second path rule for performing the second task not associated with the first task includes action 3 to action 7, the user terminal 100 may not perform already performed action 3 but perform action 4 to action 7.

Unlike the fact that a user terminal performs an action included in the second path rule for performing the first task in above-described operation 1508, in operation 1708, a user terminal may perform an action included in the second path rule for performing the second task not associated with the first task.

Hereinafter, an embodiment in which the user terminal 100 operates depending on above-described operation 1701 to operation 1708 after operation 1401 to operation 1406 are performed and then are in the partial landing state will be described with reference to FIG. 17B.

Figure 17B:
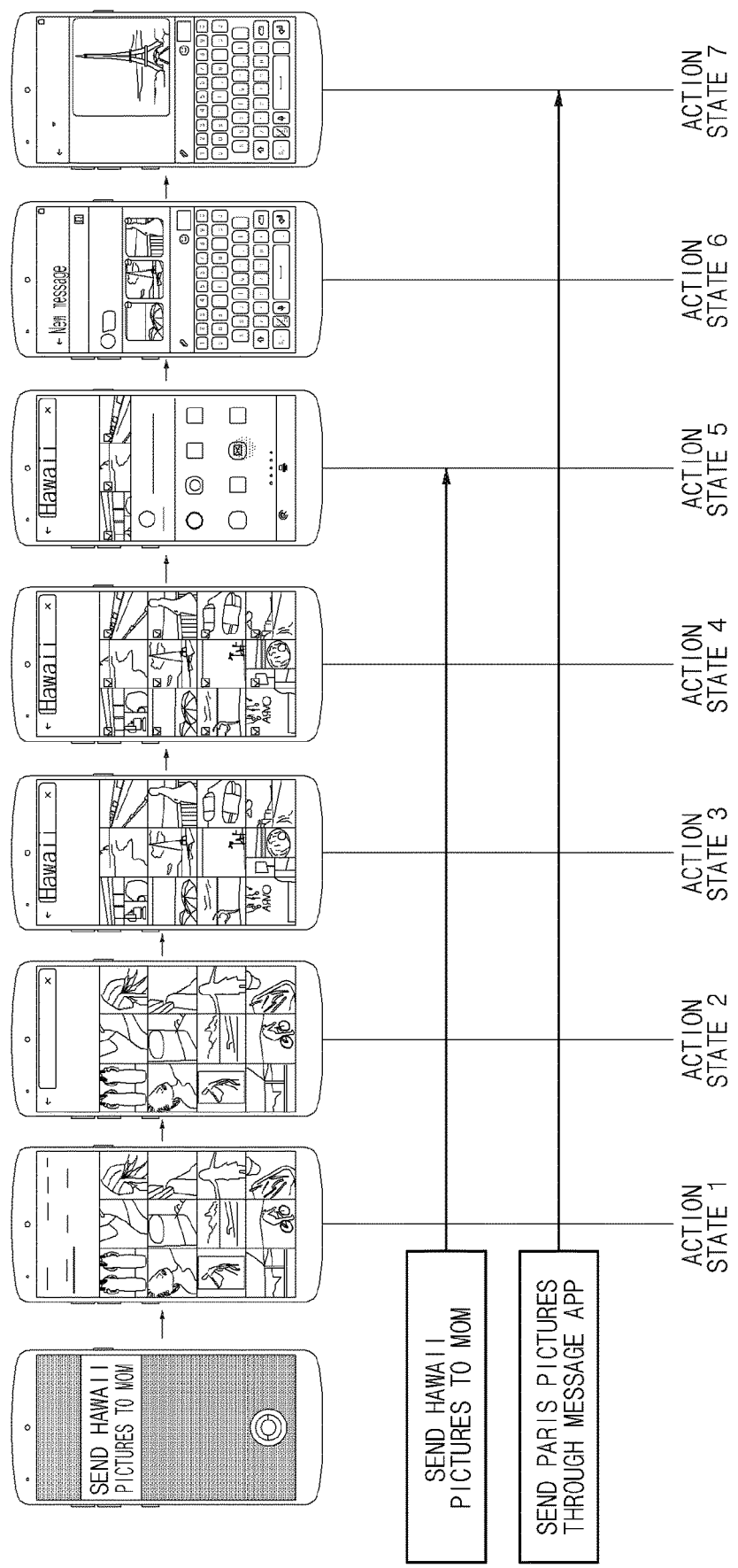
FIG. 17B is a view illustrating the case where the user terminal 100 receives a first user utterance to perform partial landing and then receives a user utterance to perform the second task, according to an embodiment of the disclosure.

FIG. 17B is a view illustrating the case where the user terminal 100 receives a first user utterance to perform partial landing and then receives a user utterance to perform the second task, according to an embodiment of the disclosure.

In the embodiment according to FIG. 17B, the user terminal 100 may make a request for an additional input to a user to determine which app will be used to send pictures, in a partial landing state (operation 1703). As illustrated in FIG. 17B, the user terminal 100 may display the list of apps to be used to transmit pictures, on the display 120.

The user terminal 100 may receive the second user utterance of "send Paris pictures through a message app" (operation 1704).

The user terminal 100 may transmit third data associated with the received second user utterance of "send Paris pictures through a message app" to the intelligence server 200 (operation 1705).

The user terminal 100 may receive a second path rule including the sequence of action states 1 to 7 (operation 1707). According to an embodiment, the second path rule may be generated based on a user interface displayed on the action state 5, an ID indicating the action state 5, a parameter used from the action state 1 to the action state 5, the first path rule, and the second user utterance of "send Paris pictures through a message app". The second path rule may include a part of the sequence already performed to perform the first task. For example, the second path rule may include a part of the sequence, which is already performed to perform the first task and which designates a recipient to Mom.

The user terminal 100 may not perform a part of actions already performed to perform the first task, from among actions of the second path rule, but perform action 2 of executing a search function of a gallery app, action 3 of searching for Paris pictures in the gallery app, action 4 of selecting Paris pictures to be transmitted, action 5 in which the transmission screen is displayed, action 6 of executing the dialog window of a message app to enter the selected Paris pictures into the dialog window, and action 7 of transmitting the entered pictures (operation 1708). According to an embodiment, the user terminal 100 may not repeat action 1 of executing the gallery app, which is an action already performed to perform the first task, from among actions of the second path rule.

According to an embodiment, the user terminal 100 may perform action 3 of searching for Paris pictures in the gallery app and action 4 of selecting Paris pictures to be transmitted. However, the user terminal 100 may not display the action state according to the action on the display 120. That is, the user terminal 100 may display only the screen corresponding to the action state 6 and the action state 7 of FIG. 17B.

The above-described embodiment will be described in comparison with the conventional user terminal. When receiving the first user utterance input of "send Hawaii pictures to Mom", the conventional user terminal may output a message for making a request for an additional input such as "which application will be used to send it?" to obtain all parameters for performing a task. Next, when receiving the second user utterance input of "send Paris pictures through KakaoTalk", the conventional user terminal may output a message for making a request for an additional input such as "whom do you want to send it to?". In other words, when performing the task according to the second user utterance input, the conventional user terminal may not use the parameter included in the first user utterance input.

When receiving the first user utterance input of "send Hawaii pictures to Mom", the user terminal 100 according to an embodiment of the disclosure may obtain a user's intent and a parameter from the received first user utterance input. The user terminal 100 according to an embodiment of the disclosure may perform an action of selecting Hawaii pictures in a gallery app and an action of displaying a screen for selecting an app that transmits pictures, depending on a path rule generated using the obtained user intent and the obtained parameter. At this time, when the user terminal 100 according to an embodiment of the disclosure receives the second user utterance input of "send Paris pictures through a message app", the user terminal 100 may perform the task that sends Paris pictures to Mom using a message app, using information (e.g., a path rule generated using the first user utterance input, or the like) associated with the action performed depending on the first user utterance input.

In other words, even when receiving a user utterance input in which the parameter for performing a task is missing, the user terminal 100 according to an embodiment of the disclosure may perform an action capable of being performed using the first user utterance input. Also, even when receiving the second user utterance input not associated with the first user utterance input, the user terminal 100 according to an embodiment of the disclosure may perform the task using information associated with the action performed using the first user utterance input.

5. Other Actions

In an embodiment, the user terminal 100 may receive a user utterance of "save the phone number of Hong Gil-Dong in the phone book". When two phone numbers of Hong Gil-Dong are saved in the user terminal 100, the user terminal 100 may perform partial landing in an action state of displaying a user interface for selecting one of two phone numbers of Hong Gil-Dong.

According to an embodiment, when the user terminal 100 receives a specific input to explicitly terminate the rule (e.g., a touch input corresponding to a back input, an utterance for terminating an application, or the like), the user terminal 100 may discard the path rule associated with "save the phone number of Hong Gil-Dong in the phone book", which is being performed. The discarding of the path rule may be performed in the application or may performed by the intelligence server 200 based on the touch input transmitted to the intelligence server 200.

In an embodiment, as described above, the user terminal 100 may perform another task depending on an event (e.g., a telephone, an alarm, or the like) received from the outside in a state where the user terminal 100 is in the partial landing state. At this time, the execution manager module 153 may store the action state of the path rule being performed; after the task according to the event is completed, the execution manager module 153 may perform the path rule from the stored action state.

In an embodiment, when the user terminal 100 receives a user utterance of "send Hawaii pictures to Hong Gil-Dong", the user terminal 100 may search for Hawaii pictures in the gallery app depending on the path rule according to the user utterance. While searching for the Hawaii pictures, the user terminal 100 may receive a new user utterance of "send Paris pictures through a message app". The user terminal 100 may change a condition of searching for pictures depending on the path rule according to the new user utterance, to a condition of searching for Paris pictures and may transmit the Paris pictures to Hong Gil-Dong, using a message app depending on the path rule according to the new user utterance.

In an embodiment, while performing a path rule, the user terminal 100 may receive a new user utterance to transmit the new user utterance to the intelligence server 200. At this time, when the NLG module of the intelligence server 200 does not grasp a user intent from a user utterance, the user terminal 100 may stop the progress of the path rule and may provide the user with a query to grasp the user intent.

In an embodiment, while the user terminal 100 performs a path rule depending on a user utterance of "send Hawaii pictures to Mom through a message app", the user terminal 100 may receive a new user utterance, which is not associated with the path rule being performed, such as "turn off Wi-Fi". In this case, the user terminal 100 may discard the path rule being performed and may perform the path rule according to the new user utterance. The determination of whether to discard the path rule being performed and to perform the path rule according to the new user utterance may be performed by the execution manager module 153 of the user terminal 100, an application, the path planner module 230 of the intelligence server 200, or the like.

In an embodiment, the persona module 155b may store the terminal information and the application obtained from the context module 155a or a device platform or the execution result of the intelligence agent 151. For example, the persona module 155b may store information capable of being obtained by a terminal, such as the location information, payment information, contacts usage information, or the life of the user terminal 100 and input records such as a touch, an utterance, a text input, or the like and may periodically transmit the stored information to the intelligence server 200.

When generating a path rule, the intelligence server 200 may use the information received from the persona module 155*b*. For example, when the intelligence server 200 receives a user utterance of "find Paris pictures and then send them to Hong Gil-Dong" from the user terminal 100, the path planner module 230 may generate a path rule, using the information, which is received from the persona module 155*b* and which indicates that an application frequently employed by a user when the user communicates with Hong Gil-Dong is KakaoTalk. In other words, the path planner module 230 may generate the same path rule as the path rule generated using a user utterance of "find Paris pictures and then send them to Hong Gil-Dong through KakaoTalk". In an embodiment, when the user terminal 100 performs the path rule using the information received from the persona module 155*b*, the user terminal 100 may receive an input associated with whether to use the information, from a user in a process state where the information provided by the persona module 155*b* is used. In another embodiment, the path planner module 230 may transmit a path rule in which a parameter is missing, to the persona module 155*b* and may allow the persona module 155*b* to fill the missing parameter such that the path rule is performed.

6. The Action in a Partial Landing State According to a Kind of Path Rule Structure A full path rule is a path rule composed of all unit actions capable of being performed depending on a user input. A partial path rule is a path rule composed of unit actions including only the unit action performed by the single one app 141 or 143. For example, when the task according to the user utterance uses a gallery app and a message app, the full path rule may include an action in the gallery app and an action in the message app. When the task according to the user utterance uses a gallery app and a message app, the partial path rule may be a path rule including only the action in the gallery app and may be a path rule including only the action in the message app. The action of the integrated intelligence system 10 in partial landing may be changed depending on the difference of the path rule structure.

(1) The Action According to the Full Path Rule Structure

In an embodiment, the user terminal 100 may receive a user utterance, in which a part of parameters for performing a task is missing, to transmit the user utterance to the intelligence server 200. The intelligence server 200 may generate a plurality of path rules capable of being performed using the received user utterance, to transmit the plurality of path rules to the user terminal 100. The user terminal 100 may perform partial landing after performing an action capable of being performed based on a plurality of path rules, excluding an action requiring the missing parameter. The user terminal 100 may output a user interface and/or a voice signal for receiving the missing parameter in a partial landing state. The user terminal 100 may receive a user input including the missing parameter to perform the task corresponding to a path rule corresponding to the user input.

For example, the user terminal 100 may receive a user utterance of "send Hawaii pictures to Mom", in which information about an app to transmit a picture is missing, to transmit the user utterance to the intelligence server 200.

The intelligence server 200 may transmit a path rule A that sends Hawaii pictures to Mom through a message app using the received user utterance, a path rule B that sends Hawaii pictures to Mom through a KakaoTalk app using the received user utterance, and a path rule C that sends Hawaii pictures to Mom through an e-mail app using the received user utterance, to the user terminal 100.

The user terminal 100 may constitute actions to be performed based on the plurality of path rules and then may perform the actions. For example, the user terminal 100 may constitute action 1 of executing a gallery app that is an action, action 2 of execution a search function of the gallery app, action 3 of searching for a picture in the gallery app, action 4 of selecting a picture to be transmitted, and action 5 in which the transmission screen is displayed, which are commonly included in the path rule A, the path rule B, and the path rule C, and may perform partial landing after performing action 1 to action 5.

The user terminal 100 may receive a voice input of "send it through a message app" for receiving the missing parameter, in a partial landing state. The user terminal 100 may perform action 6 of executing the dialog window of a message app depending on 'a path rule that sends Hawaii pictures to Mom by using a message app' corresponding to the voice input and then entering the selected picture into the dialog window and action 7 of transmitting the entered picture.

In an embodiment, the user terminal 100 may receive a user utterance, in which a part of parameters for performing a task is missing, to transmit the user utterance to the intelligence server 200. The intelligence server 200 may generate a path rule, using the received user utterance to transmit the path rule to the user terminal 100. The user terminal 100 may perform partial landing after performing an action capable of being performed based on the received path rule, excluding an action requiring the missing parameter. The user terminal 100 may receive an additional user utterance and may transmit the received additional user utterance and the previously received user utterance to the intelligence server 200. The intelligence server 200 may generate a new path rule based on the received additional user utterance and the previously received user utterance to transmit the new path rule to the user terminal 100. The user terminal 100 may perform an action depending on the received new path rule. The new path rule may include already performed actions; when performing the action depending on the new path rule, the user terminal 100 may not perform the already performed actions.

For example, the user terminal 100 may receive a user utterance of "send Hawaii pictures to Mom", in which information about the app 141 or 143 to transmit a picture is missing, to transmit the user utterance to the intelligence server 200. The intelligence server 200 may generate a path rule that sends Hawaii pictures to Mom, using the received user utterance to transmit the path rule to the user terminal 100.

The user terminal 100 may perform action 1 of executing a gallery app, action 2 of execution a search function of the gallery app, action 3 of searching for a picture in the gallery app, action 4 of selecting a picture to be transmitted, and action 5 in which the transmission screen is displayed, based on a path rule, and then may perform partial landing. The user terminal 100 may receive a voice input of "send it through a message app" for receiving the missing parameter, in a partial landing state.

The user terminal 100 may receive a voice input of "send it through a message app" for receiving the missing parameter, in a partial landing state. The user terminal 100 may transmit the received voice input of "send it through a message app" and the previously received user utterance of "send Hawaii pictures to Mom" to the intelligence server 200. The intelligence server 200 may generate a path rule, which sends Hawaii pictures to Mom by using a message app, based on the received additional user utterance and the previously received user utterance to transmit the path rule to the user terminal 100. The user terminal 100 may perform an action depending on the received new path rule; the user terminal 100 may not perform action 1 to action 5 already performed depending on the previously received path rule, but perform action 6 of executing the dialog window of a message app and then entering the selected picture into the dialog window and action 7 of transmitting the entered picture.

For another example, the user terminal 100 may receive a user utterance of "send Hawaii pictures to Mom", in which information about an app to transmit a picture is missing, and may receive the path rule according to the user utterance from the intelligence server 200 to perform partial landing. The user terminal 100 may receive an additional user utterance of "send Paris pictures through a message app". The user terminal 100 may transmit a user utterance of "send Paris pictures through a message app" and a user utterance of "send Hawaii pictures to Mom" to the intelligence server 200.

The intelligence server 200 may obtain the user intent and the parameter of the user utterance of "send Paris pictures through a message app", using the user intent and the parameter of a user utterance of "send Hawaii pictures to Mom" and may generate a new path rule, using the obtained user intent and parameter.

The user terminal 100 may perform an action depending on a new path rule; the user terminal 100 may not perform action 1 of executing a gallery app, action 2 of execution a search function of the gallery app, and action 5 in which the transmission screen is displayed, which are the already performed actions. According to an embodiment, the user terminal 100 may perform action 3 of searching for Paris pictures in the gallery app and action 4 of selecting Paris pictures to be transmitted. However, the user terminal 100 may not display the action state according to the action on the display 120.

Figure 18:
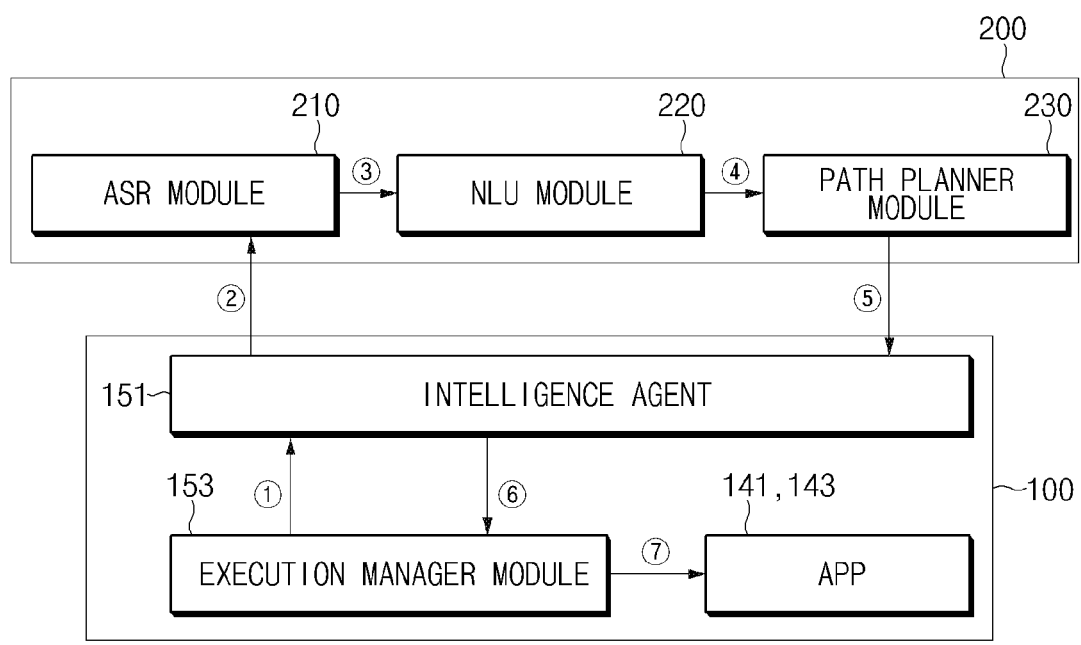
FIG. 18 is a view illustrating an action of an integrated intelligence system according to an additional user input in a partial landing state, according to an embodiment of the disclosure.

FIG. 18 is a view illustrating an action of an integrated intelligence system according to an additional user input in a partial landing state, according to an embodiment of the disclosure.

In an embodiment according to FIG. 18, the user terminal 100 may receive a user utterance, in which a part of parameters for performing a task is missing, to transmit the user utterance to the intelligence server 200. The intelligence server 200 may generate a path rule, using the received user utterance to transmit the path rule to the user terminal 100. The execution manager module 153 of the user terminal 100 may perform partial landing after performing an action capable of being performed based on the received path rule, excluding an action requiring the missing parameter and may transmit information about the partial landing state to the intelligence agent 151 (①). The user terminal 100 may receive an additional user utterance and may transmit the received additional user utterance and the information about the partial landing state to the intelligence server 200 (②). The ASR module 210 of the intelligence server 200 may convert the received user utterance into a text to transmit the converted text to the NLU module 220 (③). The NLU module 220 may obtain the user intent and the parameter from the information about the partial landing state and the text to transmit the obtained user intent and parameter to the path planner module 230 (④). The path planner module 230 may generate a path rule including information about the action already performed by the user terminal 100, using the information about the partial landing state and the received user intent and the received parameter to transmit the path rule to the user terminal 100 (⑤). The intelligence agent 151 of the user terminal 100 may instruct the execution manager module 153 to perform an action depending on the path rule received from the intelligence server 200 (⑥). The execution manager module 153 may not perform the already performed action based on the information about an action already performed by the user terminal 100, which is included in the path rule, but perform an action according to the path rule (⑦).

For example, the user terminal 100 may receive a user utterance of "send a text of 'I'm late today' through a message app", in which information about a recipient is missing, may receive the path rule according to a user utterance from the intelligence server 200 to perform action 1 of executing a message app and action 2 of entering the text of 'I'm late today' and may perform partial landing.

The user terminal 100 may receive an additional user utterance of "to Mom". The user terminal 100 may transmit information about a partial landing state together with the user utterance of "to Mom", to the intelligence server 200. The information about the partial landing state may include information about the screen currently displayed by the user terminal 100, an ID indicating the partial landing state, the progress state of the path rule, and the like.

The ASR module 210 may convert the received user utterance into a text to transmit the converted text to the NLU module 220, and The NLU module 220 may obtain the user intent and the parameter from the information about the partial landing state and the text to transmit the obtained user intent and parameter to the path planner module 230. The path planner module 230 may generate a path rule that sends the text of 'I'm late today' to Mom, using information indicating that the user terminal 100 performs action 1 of executing a message app and action 2 of entering a text of 'I'm late today' by using the information about the partial landing state, the received user intent, and the received parameter and by using a message app and then may transmit the generated path rule to the user terminal 100.

The intelligence agent 151 of the user terminal 100 may instruct the execution manager module 153 to perform an action according to the path rule. The execution manager module 153 may not perform action 1 of executing the message app and action 2 of entering the text of 'I'm late today', which are already performed, using information about an action already performed by the user terminal 100, but perform action 3 of selecting Mom as a recipient and action 4 of transmitting a message.

(2) The Action According to a Partial Path Rule Structure

Figure 19A:
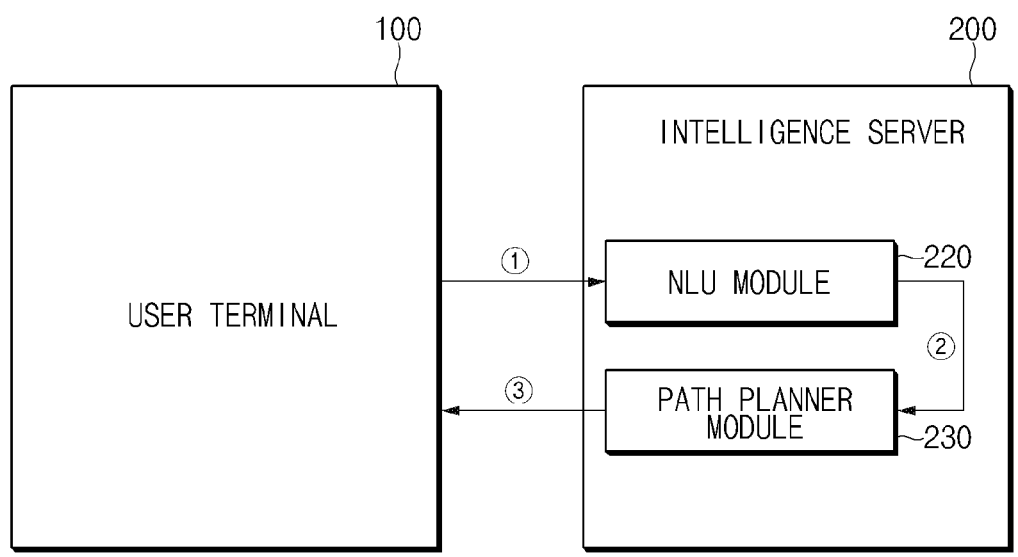
FIGS. 19A and 19B are views illustrating an action of an integrated intelligence system in which a path rule has a partial path rule structure, according to an embodiment of the disclosure.
Figure 19B:
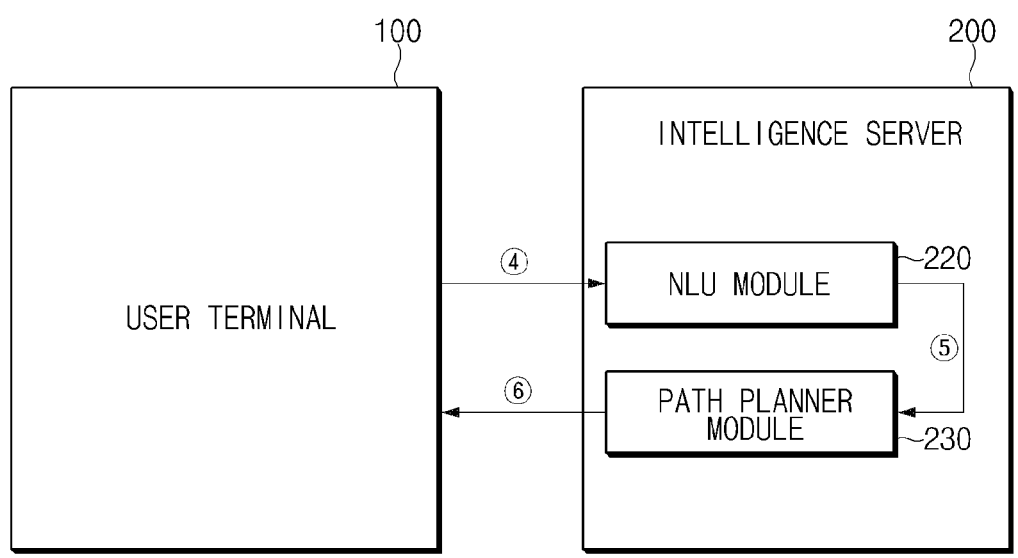

FIGS. 19A and 19B are views illustrating an action of the integrated intelligence system 10 in which a path rule has a partial path rule structure, according to an embodiment of the disclosure.

Referring to FIG. 19A, in the integrated intelligence system 10 using a partial path rule structure, the user terminal 100 may receive a user utterance for performing a task using the two or more apps 141 and 143 to transmit the user utterance to the intelligence server 200 (①). The NLU module 220 of the intelligence server 200 may obtain a user intent and a parameter from the user utterance to transmit the user intent and the parameter to the path planner module 230 (②). The path planner module 230 may generate a partial path rule set, using the user intent and the parameter to transmit the partial path rule set to the user terminal 100 (③). The user terminal 100 may perform an action based on the received partial path rule set.

In an embodiment, referring to FIG. 19A, the user terminal 100 may receive a user utterance, in which a part of parameters for performing a task using the two or more apps 141 and 143 is missing, to transmit the user utterance to the intelligence server 200 (①). The NLU module 220 of the intelligence server 200 may obtain a user intent and a parameter from the user utterance to transmit the user intent and the parameter to the path planner module 230 (②). At this time, the NLU module 220 may further transmit a user utterance, from which the NLU module 220 fails to obtain the user intent and the parameter due to a missing parameter, to the path planner module 230. The path planner module 230 may generate a path rule based on the received user intent and the received parameter and may transmit the generated path rule and the received user utterance to the user terminal 100 (③). In an embodiment, the path planner module 230 may generate a path rule in an app unit. For example, the path planner module 230 may generate a path rule composed of actions using a message app and a path rule composed of actions using a gallery app. The user terminal 100 may perform partial landing after performing an action depending on the received path rule. In an embodiment, a state where the user terminal 100 is in a partial landing state may be a state of performing a part of the received plurality of partial path rules. For example, when the user terminal 100 receives the path rule composed of actions using the message app and the path rule composed of actions using the gallery app, a state where the user terminal 100 performs only the path rule composed of actions using the message app may be a partial landing state.

Referring to FIG. 19B, the user terminal 100 may receive an additional user utterance to transmit the additional user utterance to the intelligence server 200. At this time, the user terminal 100 may further transmit the previous user utterance received from the path planner module 230 (④). The NLU module 220 of the intelligence server 200 may obtain a user intent and a parameter from the additional user utterance and the previous user utterance to transmit the user intent and the parameter to the path planner module 230. At this time, the NLU module 220 may transmit only the user intent and the parameter according to the additional user utterance among the obtained user intent and the obtained parameter, to the path planner module 230 (⑤). The path planner module 230 may generate a path rule using only the user intent and the parameter according to the additional user utterance to transmit the path rule to the user terminal 100 (⑥). The user terminal 100 may perform an action based on the path rule received in the partial landing state.

For example, referring to FIG. 19A, the user terminal 100 may receive a first user utterance of "send Paris pictures to Mom" for performing a task using a gallery app and a photo sending app to transmit the first user utterance to the intelligence server 200 (①). The first user utterance may not include a parameter associated with which app will be used to send a picture. The NLU module 220 of the intelligence server 200 may obtain a user intent and a parameter to send Paris pictures by using a gallery app, from the first user utterance to transmit the user intent and the parameter to the path planner module 230 (②). At this time, the NLU module 220 may transmit a user intent and a parameter of finding Paris pictures by using the gallery app by the missing parameter. However, because the NLU module 220 does not obtain the user intent and the parameter of a photo sending app, the NLU module 220 may further transmit a first user utterance of "send Paris pictures to Mom" to the path planner module 230. The path planner module 230 may generate a path rule that finds Paris pictures in the gallery app based on the received user intent and the received parameter and may transmit the path rule and the first user utterance to the user terminal 100 (③). The user terminal 100 may perform partial landing after performing an action of finding Paris pictures in the gallery app depending on the received path rule.

Referring to FIG. 19B, the user terminal 100 may receive the second user utterance of "send it through a message" to transmit the additional user utterance to the intelligence server 200. At this time, the user terminal 100 may further transmit the first user utterance received from the path planner module 230 (④). The NLU module 220 of the intelligence server 200 may obtain a user intent and a parameter from the second user utterance and the first user utterance to transmit the user intent and the parameter to the path planner module 230. At this time, the NLU module 220 may transmit only the user intent and the parameter according to the second user utterance among the obtained user intent and the obtained parameter, to the path planner module 230 (⑤). That is, the NLU module 220 may transmit only the user intent and the parameter of making a request for the selected picture by using a message app, to the path planner module 230. The path planner module 230 may generate a path rule that sends the selected picture by using a message app, using only the user intent and the parameter according to the second user utterance to transmit the path rule to the user terminal 100 (⑥). The user terminal 100 may perform an action of sending the selected Paris pictures by using a message app, based on the path rule received in the partial landing state.

In another embodiment, referring to FIG. 19A, the user terminal 100 may receive a user utterance, in which a part of parameters for performing a task using the two or more apps 141 and 143 is missing, to transmit the user utterance to the intelligence server 200 (①). The NLU module 220 of the intelligence server 200 may obtain a user intent and a parameter from the user utterance to transmit the user intent and the parameter to the path planner module 230 (②).

In an embodiment, the NLU module 220 may generate a user intent and a parameter for a second partial path rule using a second app capable of constituting a path rule set, together with a first partial path rule using a first app capable of being generated from the user intent and the parameter obtained from a user utterance. The NLU module 220 may transmit the user intent and the parameter for the second partial path rule using a second app, to the path planner module 230.

The path planner module 230 may generate one or more path rule sets composed of the first partial path rule and one or more second partial path rules, based on the received user intent and the received parameter to transmit the one or more path rule sets to the user terminal 100. The user terminal 100 may perform partial landing after performing an action capable of being performed based on a plurality of path rules. In other words, the user terminal 100 may perform partial landing after performing an action depending on the first partial path rule included in the path rule set. The user terminal 100 may receive a user input to receive a parameter missing in the partial landing state and may perform an action according to the second partial path rule, which corresponds to the user input, from among the one or more second partial path rules.

For example, referring to FIG. 19A, the user terminal 100 may receive a first user utterance of "send Paris pictures to Mom" for performing a task using a gallery app and a photo sending app to transmit the first user utterance to the intelligence server 200 (①). The first user utterance may not include a parameter associated with which app will be used to send a picture. The NLU module 220 of the intelligence server 200 may obtain a user intent and a parameter of sending Paris pictures by using a gallery app, from the first user utterance. However, the NLU module 220 of the intelligence server 200 may not obtain a parameter associated with which app will be used to send a picture. The NLU module 220 may transmit, to the path planner module 230, a user intent and a parameter saying that "send a picture by using a message app", a user intent and a parameter saying that "send a picture by using a KakaoTalk", and a user intent and a parameter saying that "send a picture by using an e-mail" (②) for a second path rule capable of being composed of a path rule set, together with the first path rule capable of being generated from a user intent and a parameter saying that "send Paris pictures by using a gallery app". The path planner module 230 may generate and transmit, to the user terminal 100, a path rule set that sends Paris pictures to Mom through a message app using the received user intent and parameter, a path rule set that sends Paris pictures to Mom through the KakaoTalk app 141 or 143 using the received user intent and parameter, and a path rule set that sends Paris pictures to Mom through an e-mail app using the received user intent and parameter. The user terminal 100 may perform partial landing after performing an action of finding Paris pictures in the gallery app depending on the first path rule. The user terminal 100 may receive a voice input of "send it through a message app" in the partial landing state and may perform an action of sending Paris pictures to Mom, using a message app corresponding to the user input among the received plurality of second path rules.

Figure 20:
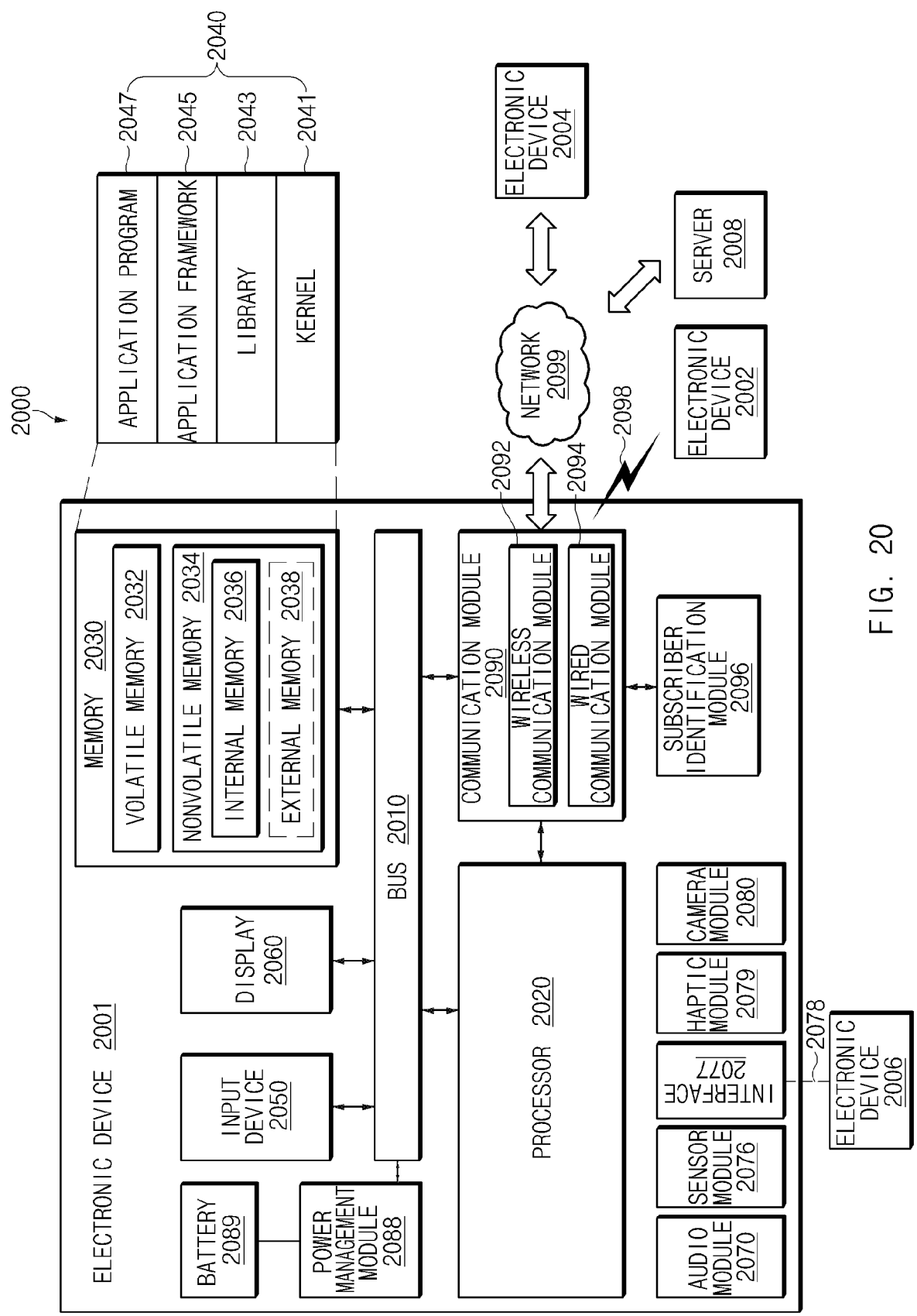
FIG. 20 illustrates a block diagram of an electronic device in a network environment, according to various embodiments.

FIG. 20 illustrates a block diagram of an electronic device 2001 in a network environment 2000, according to various embodiments. An electronic device according to various embodiments of the disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automated teller machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of the disclosure may not be limited to the above-described devices, and may provide functions of a plurality of devices like smartphones which have measurement function of personal biometric information (e.g., heart rate or blood glucose). In the disclosure, the term "user" may refer to a person who uses an electronic device or may refer to a device (e.g., an artificial intelligence electronic device) that uses the electronic device.

Referring to FIG. 20, under the network environment 2000, the electronic device 2001 (e.g., the user terminal 100) may communicate with an electronic device 2002 through local wireless communication 2098 or may communication with an electronic device 2004 or a server 2008 through a network 2099. According to an embodiment, the electronic device 2001 may communicate with the electronic device 2004 through the server 2008.

According to an embodiment, the electronic device 2001 may include a bus 2010, a processor 2020 (e.g., the processor 150), a memory 2030, an input device 2050 (e.g., a micro-phone or a mouse), a display device 2060, an audio module 2070, a sensor module 2076, an interface 2077, a haptic module 2079, a camera module 2080, a power management module 2088, a battery 2089, a communication module 2090, and a subscriber identification module 2096. According to an embodiment, the electronic device 2001 may not include at least one (e.g., the display device 2060 or the camera module 2080) of the above-described components or may further include other component(s).

The bus 2010 may interconnect the above-described components 2020 to 2090 and may include a circuit for conveying signals (e.g., a control message or data) between the above-described components.

The processor 2020 may include one or more of a central processing unit (CPU), an application processor (AP), a graphic processing unit (GPU), an image signal processor (ISP) of a camera or a communication processor (CP). According to an embodiment, the processor 2020 may be implemented with a system on chip (SoC) or a system in package (SiP). For example, the processor 2020 may drive an operating system (OS) or an application program to control at least one of another component (e.g., hardware or software component) of the electronic device 2001 connected to the processor 2020 and may process and compute various data. The processor 2020 may load a command or data, which is received from at least one of other components (e.g., the communication module 2090), into a volatile memory 2032 to process the command or data and may store the result data into a nonvolatile memory 2034.

The memory 2030 may include, for example, the volatile memory 2032 or the nonvolatile memory 2034. The volatile memory 2032 may include, for example, a random access memory (RAM) (e.g., a dynamic RAM (DRAM), a static RAM (SRAM), or a synchronous DRAM (SDRAM)). The nonvolatile memory 2034 may include, for example, a programmable read-only memory (PROM), an one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 2034 may be configured in the form of an internal memory 2036 or the form of an external memory 2038 which is available through connection only if necessary, according to the connection with the electronic device 2001. The external memory 2038 may further include a flash drive such as compact flash (CF), secure digital (SD), micro secure digital (Micro-SD), mini secure digital (Mini-SD), extreme digital (xD), a multimedia card (MMC), or a memory stick. The external memory 2038 may be operatively or physically connected with the electronic device 2001 in a wired manner (e.g., a cable or a universal serial bus (USB)) or a wireless (e.g., Bluetooth) manner.

For example, the memory 2030 may store, for example, at least one different software component, such as a command or data associated with the program 2040, of the electronic device 2001. The program 2040 may include, for example, a kernel 2041, a library 2043, an application framework 2045 or an application program (interchangeably, "application") 2047.

The input device 2050 may include a microphone, a mouse, or a keyboard. According to an embodiment, the keyboard may include a keyboard physically connected or a virtual keyboard displayed through the display device 2060.

The display device 2060 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 2001.

The audio module 2070 may convert, for example, from a sound into an electrical signal or from an electrical signal into the sound. According to an embodiment, the audio module 2070 may acquire sound through the input device 2050 (e.g., a microphone) or may output sound through an output device (not illustrated) (e.g., a speaker or a receiver) included in the electronic device 2001, an external electronic device (e.g., the electronic device 2002 (e.g., a wireless speaker or a wireless headphone)) or an electronic device 2006 (e.g., a wired speaker or a wired headphone) connected with the electronic device 2001

The sensor module 2076 may measure or detect, for example, an internal operating state (e.g., power or temperature) of the electronic device 2001 or an external environment state (e.g., an altitude, a humidity, or brightness) to generate an electrical signal or a data value corresponding to the information of the measured state or the detected state. The sensor module 2076 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 2076 may further include a control circuit for controlling at least one or more sensors included therein. According to an embodiment, the electronic device 2001 may control the sensor module 2076 by using the processor 2020 or a processor (e.g., a sensor hub) separate from the processor 2020. In the case that the separate processor (e.g., a sensor hub) is used, while the processor 2020 is in a sleep state, the separate processor may operate without awakening the processor 2020 to control at least a portion of the operation or the state of the sensor module 2076.

According to an embodiment, the interface 2077 may include a high definition multimedia interface (HDMI), a universal serial bus (USB), an optical interface, a recommended standard 232 (RS-232), a D-subminiature (D-sub), a mobile high-definition link (MHL) interface, a SD card/MMC (multi-media card) interface, or an audio interface. A connector 2078 may physically connect the electronic device 2001 and the electronic device 2006. According to an embodiment, the connector 2078 may include, for example, an USB connector, an SD card/MMC connector, or an audio connector (e.g., a headphone connector).

The haptic module 2079 may convert an electrical signal into mechanical stimulation (e.g., vibration or motion) or into electrical stimulation. For example, the haptic module 2079 may apply tactile or kinesthetic stimulation to a user. The haptic module 2079 may include, for example, a motor, a piezoelectric element, or an electric stimulator.

The camera module 2080 may capture, for example, a still image and a moving picture. According to an embodiment, the camera module 2080 may include at least one lens (e.g., a wide-angle lens and a telephoto lens, or a front lens and a rear lens), an image sensor, an image signal processor, or a flash (e.g., a light emitting diode or a xenon lamp).

The power management module 2088, which is to manage the power of the electronic device 2001, may constitute at least a portion of a power management integrated circuit (PMIC).

The battery 2089 may include a primary cell, a secondary cell, or a fuel cell and may be recharged by an external power source to supply power at least one component of the electronic device 2001.

The communication module 2090 may establish a communication channel between the electronic device 2001 and an external device (e.g., the first external electronic device 2002, the second external electronic device 2004, or the server 2008). The communication module 2090 may support wired communication or wireless communication through the established communication channel. According to an embodiment, the communication module 2090 may include a wireless communication module 2092 or a wired communication module 2094. The communication module 2090 may communicate with the external device through a first network 2098 (e.g. a wireless local area network such as Bluetooth or infrared data association (IrDA)) or a second network 2099 (e.g., a wireless wide area network such as a cellular network) through a relevant module among the wireless communication module 2092 or the wired communication module 2094.

The wireless communication module 2092 may support, for example, cellular communication, local wireless communication, global navigation satellite system (GNSS) communication. The cellular communication may include, for example, long-term evolution (LTE), LTE Advance (LTE-A), code division multiple access (CDMA), wideband CDMA (WCDMA), universal mobile telecommunications system (UMTS), Wireless Broadband (WiBro), or Global System for Mobile Communications (GSM). The local wireless communication may include wireless fidelity (Wi-Fi), Wi-Fi Direct, light fidelity (Li-Fi), Bluetooth, Bluetooth low energy (BLE), ZigBee, near field communication (NFC), magnetic secure transmission (MST), radio frequency (RF), or a body area network (BAN). The GNSS may include at least one of a Global Positioning System (GPS), a Global Navigation Satellite System (Glonass), Beidou Navigation Satellite System (Beidou), the European global satellite-based navigation system (Galileo), or the like. In the disclosure, "GPS" and "GNSS" may be interchangeably used.

According to an embodiment, when the wireless communication module 2092 supports cellar communication, the wireless communication module 2092 may, for example, identify or authenticate the electronic device 2001 within a communication network using the subscriber identification module (e.g., a SIM card) 2096. According to an embodiment, the wireless communication module 2092 may include a communication processor (CP) separate from the processor 2020 (e.g., an application processor (AP)). In this case, the communication processor may perform at least a portion of functions associated with at least one of components 2010 to 2096 of the electronic device 2001 in substitute for the processor 2020 when the processor 2020 is in an inactive (sleep) state, and together with the processor 2020 when the processor 2020 is in an active state. According to an embodiment, the wireless communication module 2092 may include a plurality of communication modules, each supporting only a relevant communication scheme among cellular communication, local wireless communication, or a GNSS communication.

The wired communication module 2094 may include, for example, a local area network (LAN) service, a power line communication, or a plain old telephone service (POTS).

For example, the first network 2098 may employ, for example, Wi-Fi direct or Bluetooth for transmitting or receiving commands or data through wireless direct connection between the electronic device 2001 and the first external electronic device 2002. The second network 2099 may include a telecommunication network (e.g., a computer network such as a LAN or a WAN, the Internet or a telephone network) for transmitting or receiving commands or data between the electronic device 2001 and the second electronic device 2004.

According to various embodiments, the commands or the data may be transmitted or received between the electronic device 2001 and the second external electronic device 2004 through the server 2008 connected with the second network 2099. Each of the first and second external electronic devices 2002 and 2004 may be a device of which the type is different from or the same as that of the electronic device 2001. According to various embodiments, all or a part of operations that the electronic device 2001 will perform may be executed by another or a plurality of electronic devices (e.g., the electronic devices 2002 and 2004 or the server 2008). According to an embodiment, in the case that the electronic device 2001 executes any function or service automatically or in response to a request, the electronic device 2001 may not perform the function or the service internally, but may alternatively or additionally transmit requests for at least a part of a function associated with the electronic device 2001 to any other device (e.g., the electronic device 2002 or 2004 or the server 2008). The other electronic device (e.g., the electronic device 2002 or 2004 or the server 2008) may execute the requested function or additional function and may transmit the execution result to the electronic device 2001. The electronic device 2001 may provide the requested function or service using the received result or may additionally process the received result to provide the requested function or service. To this end, for example, cloud computing, distributed computing, or client-server computing may be used.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar components may be marked by similar reference numerals. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "first," or "second," and the like, may express their components regardless of their priority or importance and may be used to distinguish one component from another component but is not limited to these components. When an (e.g., first) component is referred to as being "(operatively or communicatively) coupled with/to" or "connected to" another (e.g., second) component, it may be directly coupled with/to or connected to the other component or an intervening component (e.g., a third component) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other parts. For example, a "processor configured to (or set to) perform A, B, and C" may mean a dedicated processor (e.g., an embedded processor) for performing corresponding operations or a generic-purpose processor (e.g., a central processing unit (CPU) or an application processor (AP)) which performs corresponding operations by executing one or more software programs which are stored in a memory device (e.g., the memory 2030).

The term "module" used herein may include a unit, which is implemented with hardware, software, or firmware, and may be interchangeably used with the terms "logic", "logical block", "part", "circuit", or the like. The "module" may be a minimum unit of an integrated part or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media (e.g., the memory 2030) in the form of a program module. The instruction, when executed by a processor (e.g., the processor 2020), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each component (e.g., a module or a program module) according to various embodiments may be composed of single entity or a plurality of entities, a part of the above-described sub-components may be omitted, or other sub-components may be further included. Alternatively or additionally, after being integrated in one entity, some components (e.g., a module or a program module) may identically or similarly perform the function executed by each corresponding component before integration. According to various embodiments, operations executed by modules, program modules, or other components may be executed by a successive method, a parallel method, a repeated method, or a heuristic method, or at least one part of operations may be executed in different sequences or omitted. Alternatively, other operations may be added.

The invention claimed is:

1. An electronic device comprising:
a housing;
a display exposed through a part of the housing;
a microphone;
a speaker;
a communication circuit;
a processor electrically connected to the display, the microphone, the speaker, and the communication circuit; and
a memory electrically connected to the processor,
wherein the memory is configured to store at least one application program,
wherein instructions stored by the memory, when executed, cause the processor to:
receive a first user input including a first request for performing a first task using one or more first parameters for execution, wherein the first user input includes a part of the one or more first parameters and the first task is performed by executing the at least one application program irrelevant to defining rules of an action,
transmit first data associated with the first user input through the communication circuit to a server including an intelligence system configured to provide a first sequence of action states for the electronic device to perform at least one task using the at least one application program,
receive the first sequence of the action states for performing the first task, from the server through the communication circuit,
perform a portion of the first sequence of the action states while displaying a first execution state screen on the display, based on the part of the one or more first parameters included in the first user input,
perform partial landing by stopping the execution of the first sequence when a parameter necessary to perform the first sequence is missing in the part of the one or more first parameters,
display a second execution state screen on the display while maintaining the partial landing of the electronic device, the second execution state screen distinguished by the first execution state screen, and
transmit second data associated with the partial landing of the electronic device based on the performing the portion of the first sequence, to the server through the communication circuit.

2. The electronic device of claim 1, wherein the second data includes an identifier indicating an action state of the electronic device.

3. The electronic device of claim 1, wherein the instructions cause the processor to:
while sequentially displaying at least part of changed action states on the display, perform the portion of the first sequence of the action states.

4. The electronic device of claim 1, wherein the instructions cause the processor to:
provide a command through the display or the speaker, wherein the command is to receive a first parameter for performing the first task, which is missing from the first user input, from a user;
receive a second user input including the missing first parameter, through the microphone or a user interface on the display;
transmit third data associated with the second user input to the server through the communication circuit; and
receive a second sequence of action states from the server through the communication circuit.

5. The electronic device of claim 4, wherein the second sequence of the action states includes the portion of the first sequence of the action states already performed to perform the first task.

6. The electronic device of claim 4, wherein the instructions cause the processor to:
determine whether the second sequence of the action states includes the portion of the first sequence of the action states already performed to perform the first task; and
perform the first task based on the second sequence of the action states, without repeating the performed portion of the first sequence.

7. The electronic device of claim 6, wherein the second sequence of the action states is the same as the first sequence of the action states.

8. The electronic device of claim 6, wherein the second sequence of the action states is different from the first sequence of the action states.

9. The electronic device of claim 6, wherein the instructions cause the processor to:
after performing the first task, receive a third user input including a second request for performing a second task using one or more second parameters for execution, wherein the third user input does not include all of the one or more second parameters and includes at least one first parameter;
transmit four data associated with the third user input to the server through the communication circuit; and
receive a third sequence of action states from the server through the communication circuit.

10. The electronic device of claim 9, wherein the instructions cause the processor to:
determine whether the third sequence of the action states includes the portion of the first sequence of the action states already performed to perform the first task; and
perform the second task based on the third sequence of the action states, without repeating the performed portion of the first sequence.

11. The electronic device of claim 1, wherein the instructions cause the processor to:
provide a command through the display or the speaker, wherein the command is to receive a first parameter for performing the first task, which is missing from the first user input, from a user,
receive a third user input including a second request for performing a second task using one or more second parameters for execution, wherein the third user input does not include all of the one or more second parameters and includes at least one first parameter;

transmit third data associated with the third user input to the server through the communication circuit; and
receive a second sequence of action states from the server through the communication circuit.

12. The electronic device of claim 11, wherein the instructions cause the processor to:
determine whether the second sequence of the action states includes the portion of the first sequence of the action states already performed to perform the first task; and
perform the second task based on the second sequence of the action states, without repeating the performed portion of the first sequence.

13. The electronic device of claim 1, wherein the instructions cause the processor to:
when the first user input includes the first request for performing the first task on the at least one application program and the received first sequence of the action states is a sequence performed on a single program,
after performing the portion of the first sequence of the action states, transmit the first data and information about the performed portion of the first sequence of the action states, to the server through the communication circuit.

14. The electronic device of claim 1, wherein the intelligence system includes at least one of a path rule-based, ontology-based or deep learning-based system.

15. The electronic device of claim 1, wherein the second execution state screen is distinguished by the first execution state screen based on the second execution state screen displaying at least one of:
an edge,
a background color,
an adjustment of transparency, or
an icon of the display, from the second execution state screen.

16. An electronic device comprising:
a housing;
a display exposed through a part of the housing;
a microphone;
a speaker;
a communication circuit;
a processor electrically connected to the display, the microphone, the speaker, and the communication circuit; and
a memory electrically connected to the processor,
wherein the memory is configured to store at least one application program,
wherein instructions stored by the memory, when executed, cause the processor to:
receive a first user input including a first request for performing a first task using one or more first parameters for execution, wherein the first user input includes a part of the one or more first parameters and the first task is performed by executing the at least one application program irrelevant to defining rules of an action,
transmit first data associated with the first user input through the communication circuit to a server including an intelligence system including a first sequence of a plurality of action states for the electronic device to perform at least one task using the at least one application program,
receive the first sequence of the plurality of action states for performing the first task, from the server through the communication circuit,
perform a portion of the first sequence of the action states while displaying a first execution state screen on the display, based on the part of the one or more first parameters included in the first user input,
perform a partial landing by stopping the execution of the first sequence when a parameter necessary to perform the first sequence is missing in the part of the one or more first parameters,
display a second execution state screen on the display while maintaining the partial landing of the electronic device, the second execution state screen distinguished by the first execution state screen,
transmit second data associated with the partial landing of the electronic device based on the performing the portion of the first sequence, to the server through the communication circuit,
receive a second user input including the one or more first parameters missing in the first user input, through the microphone or a user interface on the display, and
perform remaining portions of the first sequence of the action states that were not previously performed, based on at least part of the first sequence of the action states corresponding to the received second user input, in the first sequence of the plurality of action states.

* * * * *